United States Patent
Takahashi

(10) Patent No.: US 6,636,266 B2
(45) Date of Patent: Oct. 21, 2003

(54) IMAGE RECORDING DEVICE WITH STRUCTURE FOR ADJUSTING THE DEVICE BASED ON THE VIDEO SIGNAL

(75) Inventor: Koji Takahashi, Chigasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/982,435

(22) Filed: Dec. 2, 1997

(65) Prior Publication Data

US 2003/0133034 A1 Jul. 17, 2003

Related U.S. Application Data

(63) Continuation of application No. 08/315,245, filed on Sep. 29, 1994, now abandoned.

(30) Foreign Application Priority Data

Sep. 30, 1993 (JP) ............................. 5-268026
Sep. 30, 1993 (JP) ............................. 5-268126

(51) Int. Cl.⁷ ............................................. H04N 7/01
(52) U.S. Cl. ........................... 348/445; 348/349
(58) Field of Search ........................ 348/443, 441, 348/445, 345, 349, 362, 222.1

(56) References Cited

U.S. PATENT DOCUMENTS

| | | | | |
|---|---|---|---|---|
| 4,734,772 A | | 3/1988 | Akiyama | 348/445 |
| 4,928,137 A | | 5/1990 | Kinoshita | 348/333 |
| 5,051,833 A | | 9/1991 | Tsiji | 348/349 |
| 5,159,460 A | * | 10/1992 | Senso | 348/441 |
| 5,212,516 A | | 5/1993 | Yamada et al. | 348/254 |
| 5,229,853 A | * | 7/1993 | Myers | 348/443 |
| 5,231,491 A | * | 7/1993 | Holoch | 348/445 |
| 5,233,431 A | * | 8/1993 | Yoshida et al. | 348/349 |
| 5,253,071 A | | 10/1993 | Mackay | 348/208 |
| 5,289,277 A | * | 2/1994 | Blanchard et al. | 348/441 |
| 5,298,994 A | | 3/1994 | Watanabe et al. | 348/445 |
| 5,327,235 A | * | 7/1994 | Richards | 348/441 |
| 5,373,321 A | | 12/1994 | Fukuoka et al. | 348/252 |
| 5,414,463 A | | 5/1995 | Katoh et al. | 348/207 |
| 5,436,658 A | | 7/1995 | Noga et al. | 348/207 |
| 5,446,494 A | | 8/1995 | Ueda et al. | 348/354 |
| 5,450,129 A | * | 9/1995 | Matoba et al. | 348/445 |
| 5,699,123 A | * | 12/1997 | Ebihara et al. | 348/445 |
| 5,999,215 A | * | 12/1999 | Tamura | 348/345 |
| RE37,057 E | * | 2/2001 | Lee | 348/443 |
| 6,184,931 B1 | * | 2/2001 | Kaneda | 348/345 |
| 6,275,306 B1 | * | 8/2001 | Wataya et al. | 348/445 |

* cited by examiner

*Primary Examiner*—Wendy R. Garber
*Assistant Examiner*—Jacqueline Wilson
(74) *Attorney, Agent, or Firm*—Fitzpatrick, Cella, Harper & Scinto

(57) ABSTRACT

An image pick-up device including an image taking optical system, an image pick-up element for photoelectric conversion of an object image to be projected by the image taking optical system, a system conversion circuit for outputting the image pick-up signals output from the image pick-up element as video signals in accordance with a predetermined signal standard, and a focussing control circuit for controlling focussing adjustment of the image taking optical system by using the image pick-up signal before input to the system conversion circuit.

27 Claims, 19 Drawing Sheets

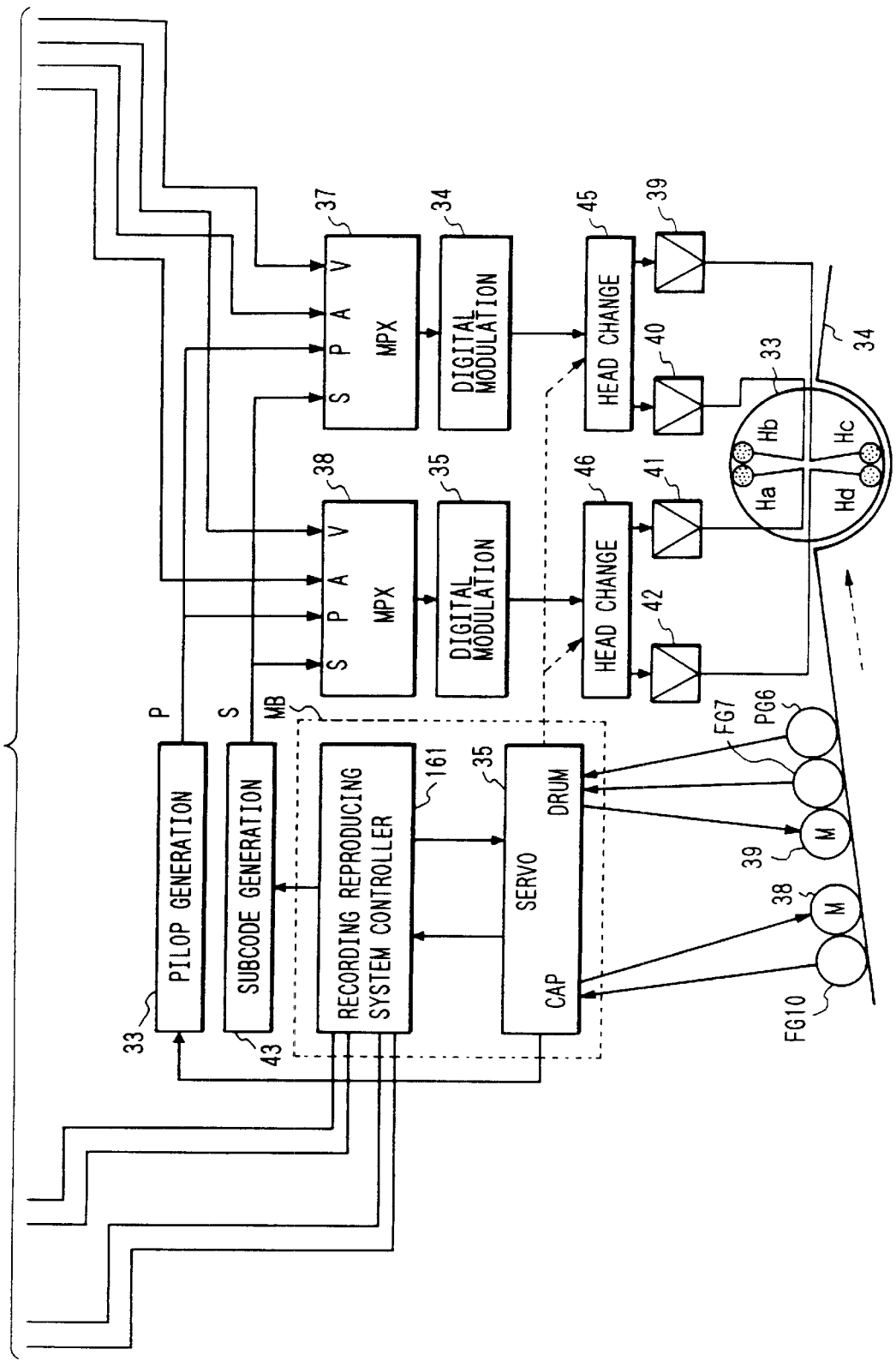

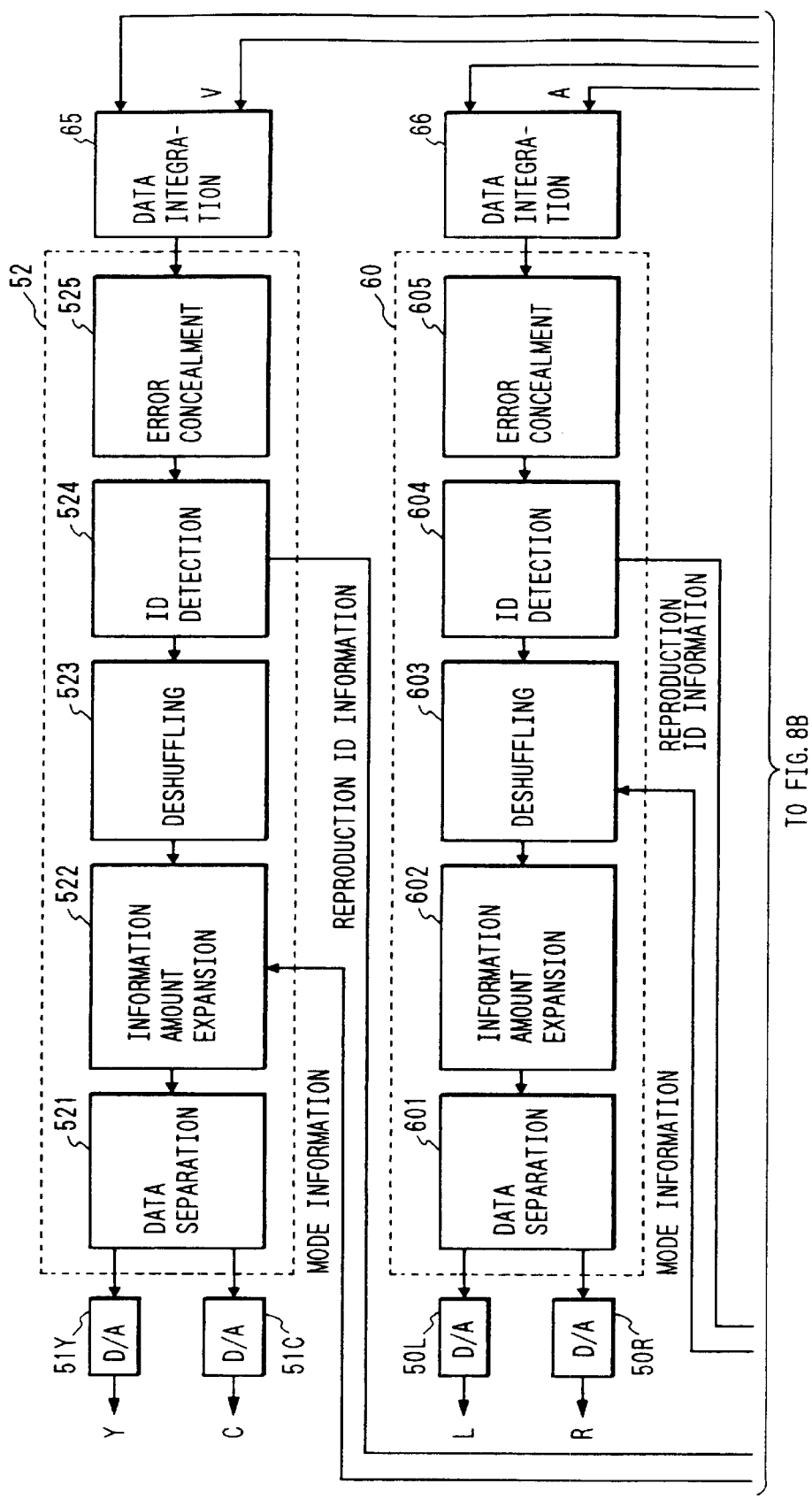

FIG. 9

| PARAMETER \ RECORDING MODE | SD - LOW | SD - HIGH | HD - TV |
|---|---|---|---|
| TAPE SPEED | HALF SPEED | NORMAL SPEED | DOUBLE SPEED |
| NUMBER OF TRACKS / FIELD | 5 | 10 | 20 |
| COMPRESSION RATIO | 1/10 | 1/5 | 1/2.5 |

IMAGE RECORDING DEVICE WITH STRUCTURE FOR ADJUSTING THE DEVICE BASED ON THE VIDEO SIGNAL

This application is a continuation of application Ser. No. 08/315,245 filed Sep. 29, 1994 now abandoned.

BACKGROUND OF THE INVENTION

1. Field of the Invention

The present invention relates to an image pick-up device and, more particularly, to a suitable image pick-up device for performing adjustment of an optical system, such as an automatic-focussing control or the like, in accordance with a plurality of television systems, such as NTSC system or PAL system.

2. Related Background Art

Up to this time, there have been many television systems in the world, as represented by the NTSC system and the PAL system, which have been used in different localities respectively. In addition to these systems, each nation has approached to propose a further highly accurate HDTV standard, make it on an experimental basis and investigate its realization in recent years. The respective systems are different in space frequency characteristic with respect to video signals or the like from each other, for example, the NTSC system and the PAL system respectively have characteristics as shown in FIG. 22.

On the other hand, with an automatic-focussing system in a video camera for domestic use, a so-called TVAF (television automatic-focussing) system is now the main current, in which the focussing control is performed by determining as to whether or not the video signal is in focus based upon increase and decrease of higher harmonic elements in video signals to be projected.

However, in the structure of such a video camera compatible with some types of multiple television systems, when performing the focussing control by the TVAF system mentioned above, adjustments are required to optimize respective parameters every picture taking mode (standard: television system) for the reason that the respective television systems are different in space frequency. Accordingly, there has been a problem that the whole configuration was complicated.

SUMMARY OF THE INVENTION

In consideration of such a point as background, the primary object of the present invention is to provide an image pick-up device enabling to perform adjustment of an optical system suitably with a simple structure.

Also, the second object of the present invention is to provide an image pick-up device enabling to perform an optimum focussing adjustment as usual irrespective of the television systems.

In order to achieve the above-mentioned objects, according to a preferred embodiment of the present invention, there is provided an image pick-up device including an optical system for forming an optical image of an object to be projected, a photoelectric conversion means for outputting the optical image formed in the optical system as a video signal by photoelectric conversion, a conversion means into the video signals converting the image pick-up signal output from the photoelectric conversion means into the video signals in accordance with a plurality of signal standards, and an adjustment means for adjusting the optical system based upon the optical signal in accordance with the signal standard before conversion in the conversion means.

The above-mentioned objects can be attained, according to another preferred embodiment of the present invention, by an image pick-up device including an optical system for forming an optical image of an object to be projected, a photoelectric conversion means for outputting the optical image formed in the optical system as a video signal by photoelectric conversion, a storage means for storing the video signal output from the photoelectric conversion means so as to perform an image processing, and an adjustment means for adjusting the optical system based upon the video signal before store in the storage means.

The foregoing objects are accomplished, according to still another preferred embodiment of the present invention, with an image pick-up device including an optical system for forming an optical image of an object to be projected, a photoelectric conversion means for outputting the optical image formed in the optical system as a video signal by photoelectric conversion, a change means for changing a space frequency characteristic of the video signal output from the photoelectric conversion means so as to perform an image processing, and an adjustment means for adjusting the optical system based upon the video signal before change in space frequency characteristic in the change means.

Another object of the present invention is to provide an image pick-up device enabling to obtain the highest AF (auto-focus) characteristic as usual by performing adjustment of an optical system, such as an AF control or the like, based upon a video signal in accordance with a signal standard before conversion by a conversion means for converting the television system, for example, in accordance with a highly accurate HDTV standard.

In such an object of the present invention, although, when performing the AF control or the like by use of a video signal from which high frequency elements have been removed by the conversion processing in the conversion means, it is required to have a complicated structure so as to optimize respective parameters every picture taking mode (television system: signal standard), the AF control or the like can be suitably performed with such a simple structure as a video signal including high frequency elements before conversion by the conversion means is used as it is.

Another object of the present invention is to prevent such inconvenience, as response characteristic in the FA system or the like is deteriorated by delay of video signals in a storage means i.e., the response is delayed or the control becomes unstable by hunting, by performing adjustment of an optical system based upon a video signal before store in the storage means such as an image memory or the like.

An additional object of the present invention is to enable to perform adjustment of an optical system suitably with a simple structure in which a video signal before store in a storage means such as an image memory or the like is used as it is.

Another object of the present invention is to perform adjustment of an optical system, such as an AF control or the like, based upon a video signal before change in space frequency characteristic in a change means, for example, a signal including a wide frequency band in accordance with an HDTV standard or the like. That is, although, when performing the AF control or the like by use of the video signal after change in space frequency characteristic in the change means, it is required to have a complicated structure so as to optimize respective parameters every picture taking mode (television system: signal standard), the AF control or the like can be suitably performed with such a simple structure as the video signal including a wide frequency band before change in space frequency characteristic in the change means is used as it is.

Still other objects of the present invention, and the features thereof, will become fully apparent from the following description, which is to be taken in conjunction with the attached drawings.

BRIEF DESCRIPTION OF THE DRAWINGS

FIGS. 6A and 6B combined as FIG. 6 show block diagrams showing a structure of a recording system of the camcorder;

FIGS. 8A and 8B combined as FIG. 8 show block diagrams showing a structure of a reproducing system of the camcorder;

FIG. 9 is a table showing parameters in accordance with respective recording modes;

DETAILED DESCRIPTION OF THE PREFERRED EMBODIMENTS

An embodiment of the present invention will be described with reference to the accompanied drawings.

1. Whole Description of Video Camera Recorder

Figure 1:
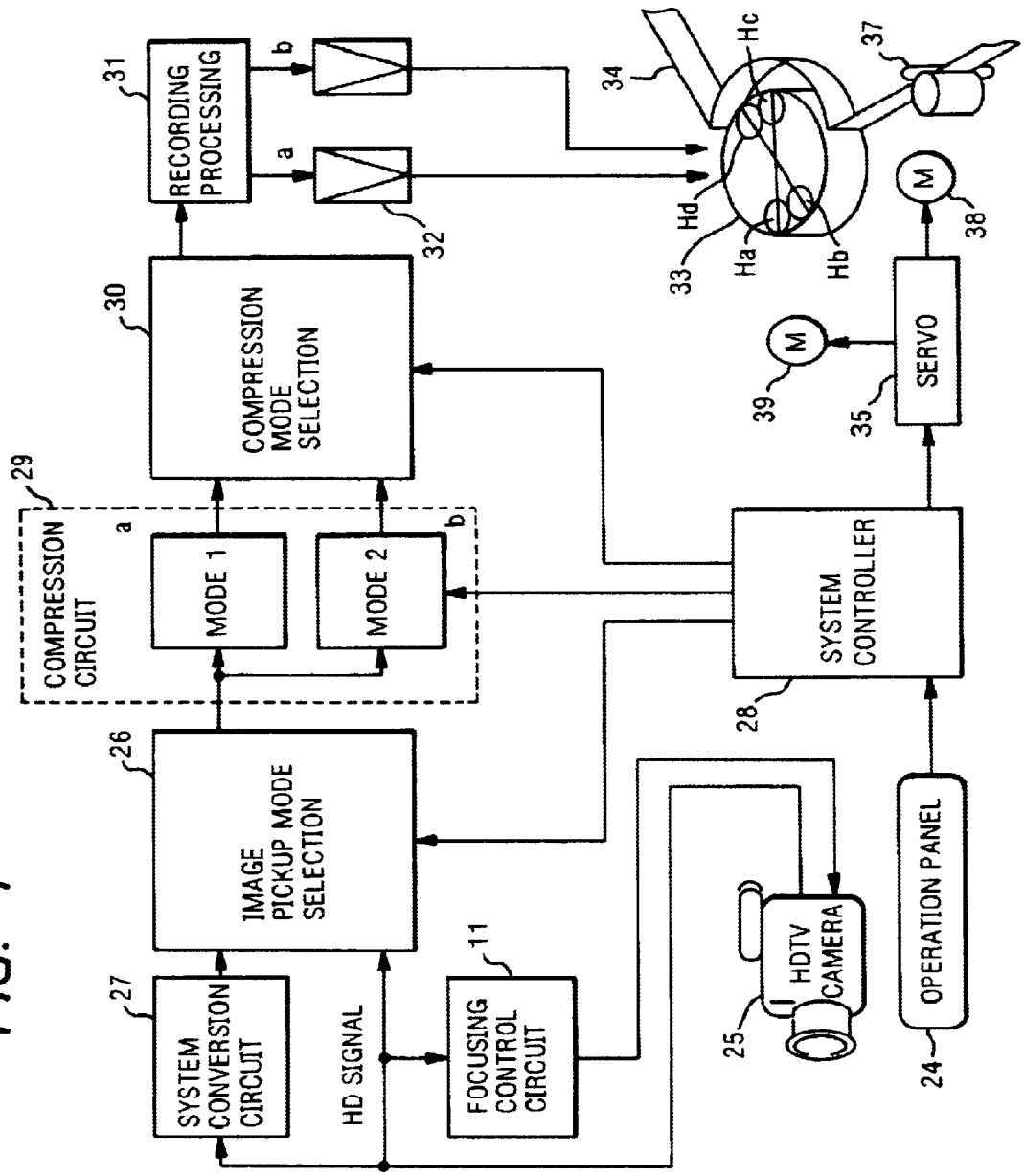
FIG. 1 is a schematic block diagram showing a structure of a camcorder which adopts an image pick-up device according to an embodiment of the present invention.

FIG. 1 is a schematic block diagram showing a structure of a camera united-type VTR (hereinafter, called as a video camera recorder) according to an embodiment of the present invention. This is a video camera recorder of multi-mode correspondence type, which can integrally treats camera image taking, compression signal processing and VTR recording in accordance with a plurality of television standards corresponding to the current television systems and the future high definition television systems.

Such a multi-mode according to the video camera recorder includes three main parts, an image pick-up mode, a compression mode and a recording mode, as described below.

Selection of Image Pick-up Mode

An image of an object to be projected is output as an HD signal having a highly accurate information amount by performing photoelectric conversion using an image pick-up element CCD provided in an HDTV camera 25.

This HD signal, according to a studio standard, has a sampling frequency of 75.3 MHz in 1920H×1035V pixels, which is distributed into two signals, one being input as the HD signal as it is to an image pick-up selection circuit 26, the other one being input to a system conversion circuit 27 such as a downconverter or the like.

The system conversion circuit 27 is, for example, as shown in the September number of *NHK Giken Monthly Report*, pp. 359–364 (1985), for reduction of information amount so as to convert the HD signal into respective signals in accordance with standard definition systems (hereinafter, called as SD), such as NTSC, PAL or SECAM system.

On the other hand, with focussing adjustment (taking the focus) of the image pick-up system, an AF (auto-focus) technique called as a TV-AF system is now the main current, in which determination as to whether or not the video signal is in focus is made by detecting high frequency elements of the video signal to be projected, so that the camcorder according to this embodiment of the present invention also adopts the TV-AF system.

Then, in order to perform the AF control effectively by use of high frequency elements in the video signal (HD signals) to be projected, according to the present invention, a signal before reduction of the high frequency elements in the system conversion processing is supplied to a focussing control circuit 11 as it is.

Figure 2:
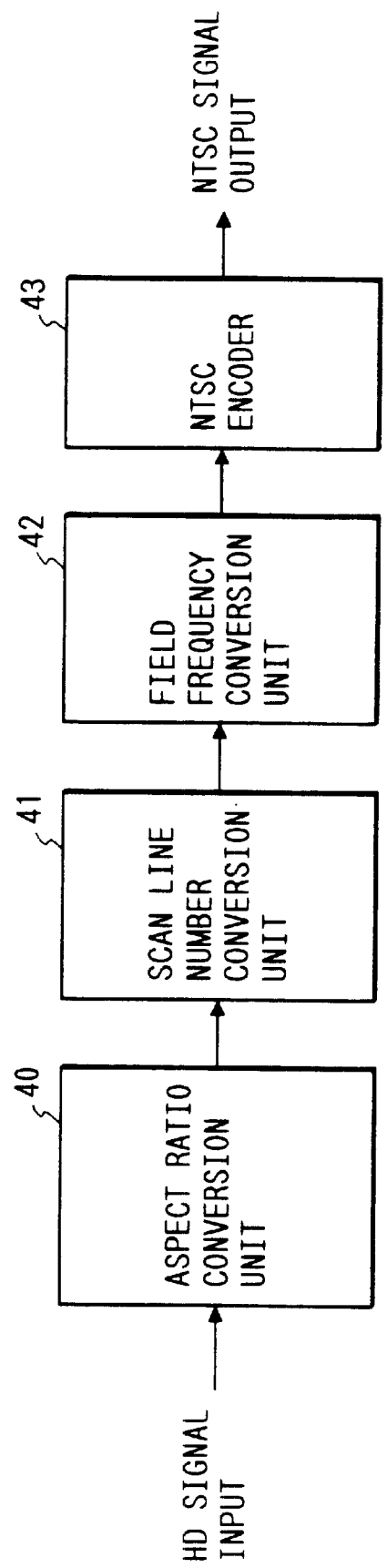
FIG. 2 is a schematic block diagram showing a structure of an HDTV-NTSC system conversion device.

Here, FIG. 2 shows a structure of an HDTV-NTSC system conversion device (commonly called as a downconverter).

Conversion of Aspect Ratio

Figure 3:
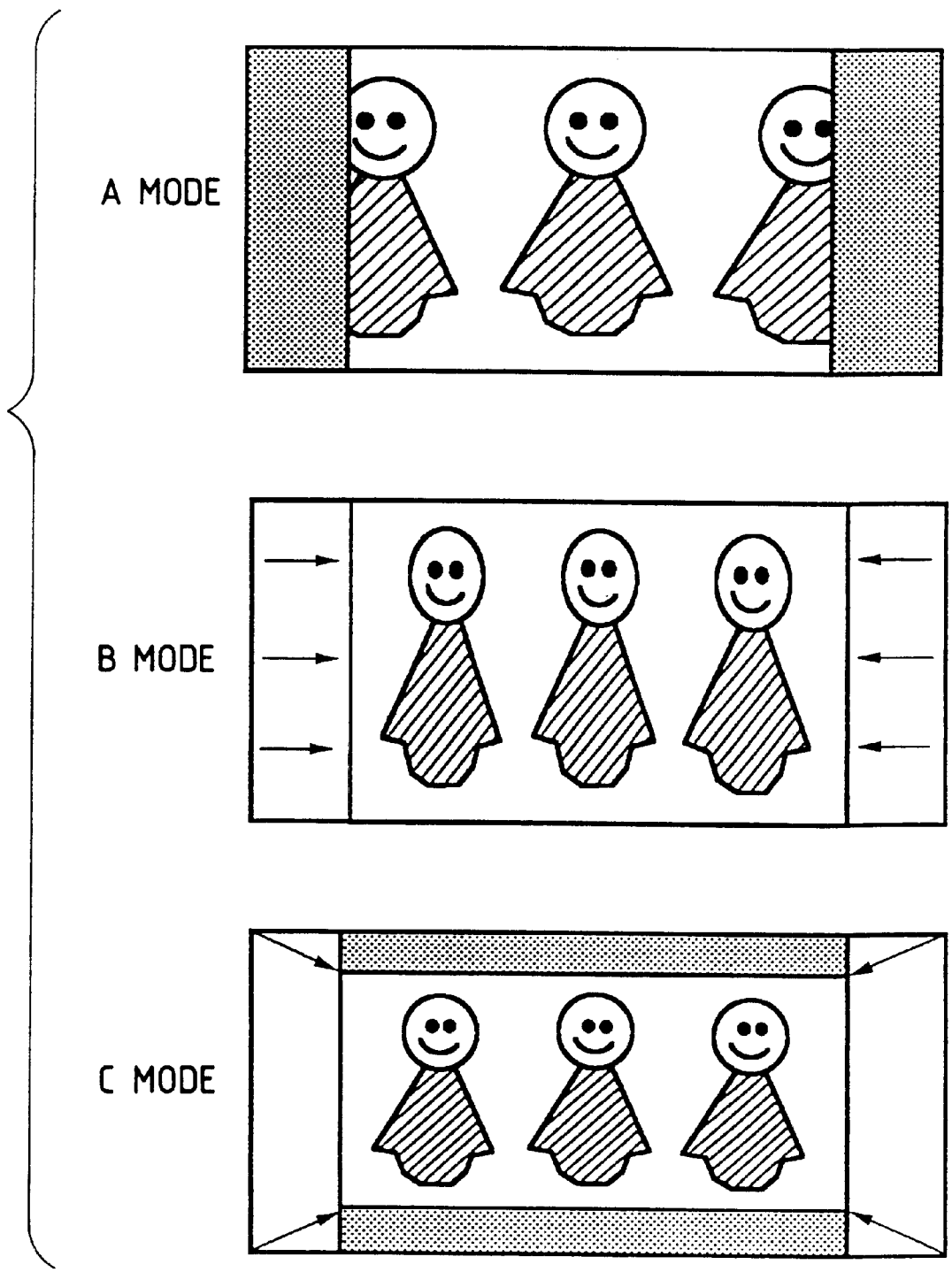
FIG. 3 is a diagram explaining examples of some types of conversion modes in accordance with aspect ratios.

FIG. 3 shows typical three conversion modes.

Mode A: The mode is called to a side panel system in which both sides of highvision image plane having a ratio vertical to horizontal 16:9 are cut so as to be the aspect ratio 4:3. If it is desired to use the NTSC signal in the conventional system, this mode can be preferably selected.

Mode B: The mode is called to a squeeze system or a full mode in which the highvision image is compressed in the transverse direction so as to be the aspect ratio 4:3. If it is desired to be converted into the NTSC signal of wide frame correspondence type, this mode can be preferably selected.

Mode C: The mode is called to a letter box system in which the image is converted to express in the ratios 1:6:9 on the frame of aspect ratio 4:3. In case of the NTSC image, there is no image on the upper and lower sides so as to be black lines. If it is desired to make a good use of an angle of view projected with an HDTV camera for the layout of the picture, this mode can be preferably selected.

Conversion of Scan Line Number

Scan line number conversion processing is performed by vertical-inserted filters which constitute a weighted average circuit switched in response to line order in a period of seven cycles.

Conversion of Field Frequency

Field frequency conversion processing is performed after the scan line number conversion processing by use of a buffer memory, so that it is possible to process for an actual time in a time axis correcting device having functions equivalent to a frame synchronizer. In the frame synchronizer used in general, although a frame skip is occurred once in every 33 minutes in a frame memory capacity, this frame skip makes the image unnatural in a dynamic picture. On the other hand, in the field frequency conversion of motion correspondence type, motion detection and scene change detection are performed by use of a frame differential signal so as to perform the frame skip only when any of the following four conditions is obtained:

(1) In case of static image;
(2) In case that a scene change occurs;
(3) In case that the dynamic image region is relatively small; or
(4) In case that there has been no room of the frame buffer memory.

In addition, the field frequency of the highvision is equal to 60 Hz and the field frequency of the NTSC system is equal to 59.9 Hz, so that both are different from each other by 1000 to 1001.

Example of HD-NTSC System Conversion Device

From the structure mentioned above, FIG. 2 shows an example of an HD-NTSC system conversion device, in which the HD signal is converted from ratio 16:9 to ratio 4:3 in an aspect ratio conversion unit 40, the scan line number is converted from 1125 to 525 in a scan line number conversion unit 41, the field frequency is converted from 60 Hz to 59.94 Hz in a field frequency conversion unit 42 and then the HD signal is output as NTSC signal via an NTSC encoder 43.

In an operation panel 29, any of HD, SD-Hi (which is high image quality for business use having horizontal resolution of the order of 450 lines) and SD-Low (which is standard image quality for domestic use having horizontal resolution of the order of 230 lines) modes can be selected. When the HD mode has been selected, the selected signal is input through a system controller 28 to an image pick-up mode selection circuit 26, so that the HD signal is selected in the image pick-up mode selection circuit 26 so as to be output as it is.

On the other hand, when the SD-Hi or SD-Low mode has been selected, the NTSC signal which has been down-converted by the system conversion circuit 27 is selected and output.

Compression Mode Selection

The video signal output from the image pick-up mode selection circuit 26 is input to a compression circuit 29 as image information. The compression circuit 29 includes a plurality of compression modes so that compressibility and compression system can be changed in accordance with the compression modes. For the compressibility, it is considered to be ¼, ⅛, 1/16 and 1/32. The compression system can adopt DCT, DPCM, Hadamard transform, ADRC or the like, or the combination thereof so that it is possible, for example, to adopt DCT as a compression mode 1 and DPCM as a compression mode 2. Also, only the compressibility may be selectable under one compression system. A compressed signal is input to a compression mode selection circuit 30 to select a desired compression mode and then a compression processed signal is output.

These mode selections are closely related to recording time or selection of the image quality in the VTR side, or to image pick-up quality or mode setting in the camera side, thus automatically selecting and setting the mode in response to the mode setting of the VTR or the camera.

As for the data rate, in connection with a recording system described later, it is desirable to show a ratio of an integral number, for example, 50 Mbps in the HD mode, 25 Mbps in the SD-Hi mode and 12.5 Mbps in the SD-Low mode.

Selection of Recording Mode

The compressed signal output from the compression mode selection circuit 30 is input to a recording processing circuit 31 so as to be distributed into two signals by respective channels corresponding to two pairs of heads Ha, Hb and Hc, Hd, the respective signal are amplified by a recording amplifier 32 and then the signals are digital-recorded on a magnetic tape 34 by the two pairs of magnetic heads Ha–Hd provided on a drum 33. The same width of track is applied to the respective recording modes so that the recording mode is selected properly in accordance with the result of selection of the compression mode selection circuit 30, and then the data recording track corresponding to the data rate is formed on the magnetic tape 34.

A servo control circuit 35 controls a drum motor 39 and a capstan motor 38 so as to drive a rotating drum 33 and a capstan 37, respectively, thus keeping the revolting number of the rotating drum 33 and tape run speed at a predetermined target value.

The predetermined target value in the servo control circuit 35 is set in accordance with the respective modes under control of the system controller 28 which receives operating directions from the operation panel 24. The respective mode selections are performed in accordance with a state of a mode selection switch provided on the operation panel 24 as follows. Table for comparison of data amount by mode

| Selection mode | Image pick-up system | Compressibility | Recording data rate |
|---|---|---|---|
| HD | HD | 1/10 | 50 Mbps |
| SD-Hi | SD | 1/5 | 25 Mbps |
| SD-Low | SD | 1/10 | 12.5 Mbps |

2. Description of HDTV Camera

Figure 4:
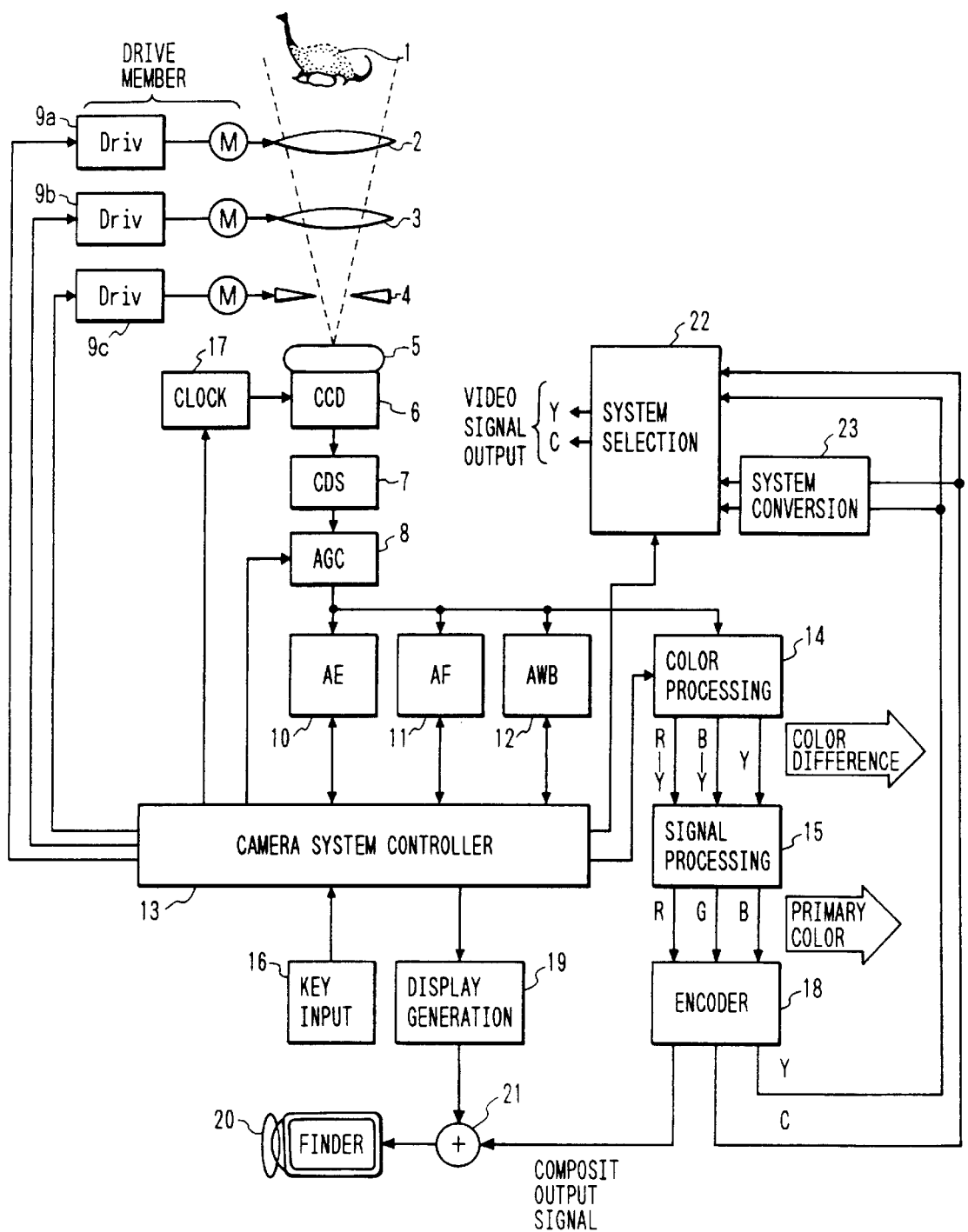
FIG. 4 is a schematic block diagram of an HDTV camera.

FIG. 4 is a schematic diagram showing a structure of the HDTV camera 25.

The incident light from an object to be projected enters through an image pick-up optical system including a focus lens 2 for changing the focussing position, a zoom lens 3 for changing the magnification (focussing distance) and an iris diaphragm 4 for adjusting the light amount, in a photoelectric conversion portion including a color filter 5 and a CCD (solid image pick-up element) 6 so as to be converted into a color video signal by the CCD 6. Then, drive members 9a, 9b and 9c are provided for a stepping motor and the like in the focus lens 2, the zoom lens 3 and iris 4 respectively, to which a camera system controller 13 is commonly connected so as to be drive-controlled therethrough in response to a signal from an AF (automatic focussing control) circuit 11, an AE (automatic exposure control) circuit 10 or a key input portion 16, thus taking a proper picture.

In the CCD 6, a photoelectric charge generated in the receiving part is transmitted to the transfer part so as to be produced as an output signal. As to the signal, the noise is reduced by a CDS circuit 7 and the gain is controlled by an AGC circuit 8. At this time, the gain is also adjusted via the camera system controller 13 in consideration of information from the AE circuit 10. Thereafter, the signal is supplied to a signal processing circuit 15 via a color processing circuit 14.

The camera system controller 13 properly controls the drive members 9a to 9c of the image pick-up optical system in response to the values of focussing position, magnification (focussing distance), exposure and the like set by the key input portion 16. Also, a drive pulse for the CCD 6 controls clocks, which should be generated in a clock generation circuit 17, so as to synchronize every kind of operation with each other.

After adjustment of the gain, a control signal for white balance adjustment is generated by an AWB circuit 12 so as to adjust the gain of a color difference signal in the color processing circuit 14. Next, each color video signal, being separated into RGB of the three primary colors by the signal processing circuit 15, is modulated into a composite signal and is output.

The composite output signal is input to a view finder 20 after adding it to an output signal from a display information generation circuit 19 in an adder 21 for obtaining information from the camera system controller 13, so that users can see every kind of information together with the appearance of the object 1.

Such a component output signal may be produced from the RGB primary signals in the preceding step or from Y, R-Y and B-Y color difference signals in the step before the last step.

The component output signal, of course, as shown in FIG. 4 according to the embodiment, may assume the form (in which two color signals I and Q, or R-Y and B-Y are orthogonally modulated) of Y/C separated-type (e.g., S terminal form) of an encoder 18.

In addition, when performing each of the signal processing in the form of digital data, the component signal may be output in the form of the digital data before a process of an unillustrated DAC (digital-analog converter).

The above-mentioned information on brightness (Y) and color (C) is distributed into two signals, one is directly supplied to a system selection circuit 22, while the other one is supplied to the system selection circuit 22 after processing in a system conversion circuit 23. Then, the system selection circuit 22 selectively outputs two image informations as to before and after system conversion. This selection is directed from the key input portion 16 through the camera system controller 13. The system conversion circuit 23 can perform the conversion in the form of the downconverter type, or between SD systems of the same types, such as PAL-NTSC or the like.

Here, with the relationship between system conversion and TV-AF, it is said that the HDTV signal includes information amount approximately five times as much as that of the current system. Similarly, the HDTV signal includes the high frequency spectrum elements more than SD signal.

Figure 21:
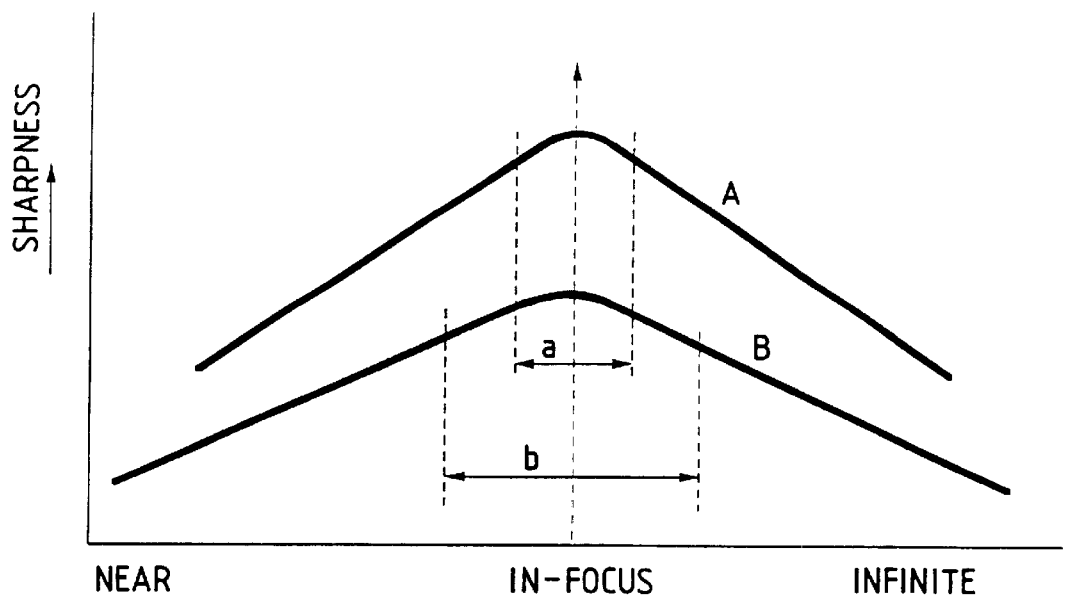
FIG. 21 is a graph showing level changes of high frequency element content of both an HDTV signal and an NTSC signal when focussing positions of respective image pick-up optical systems are shifted from a near distance to infinity.

FIG. 21 shows level changes of high frequency element content in two systems mentioned above when focussing positions of each image pick-up optical system are shifted from a near distance to infinity.

In FIG. 21, curve A indicates a change of the HDTV signal and curve B indicates a change of the current TV signal. Each of the curves reaches the peak at focussing point and the relationship between A and B at the height of the focussing point shows A>B. When restarting the AF, the relationship between focussing regions a and b shows a<b. Here, as the curve is sharper, the focussing region becomes narrow so as to repeat the restart calculation processing frequently. As a result, if considered only from the viewpoint of focussing accuracy, the curve A shows better focussing characteristic than the curve B. That is, it is considered that the case of using video information of the HD-TV having a lot of information amount is improved in the TVAF performance. Then, in the image pick-up system using the downconverter, the video information before the process of the downconverter is preferably used for the TVAF.

Figure 22:
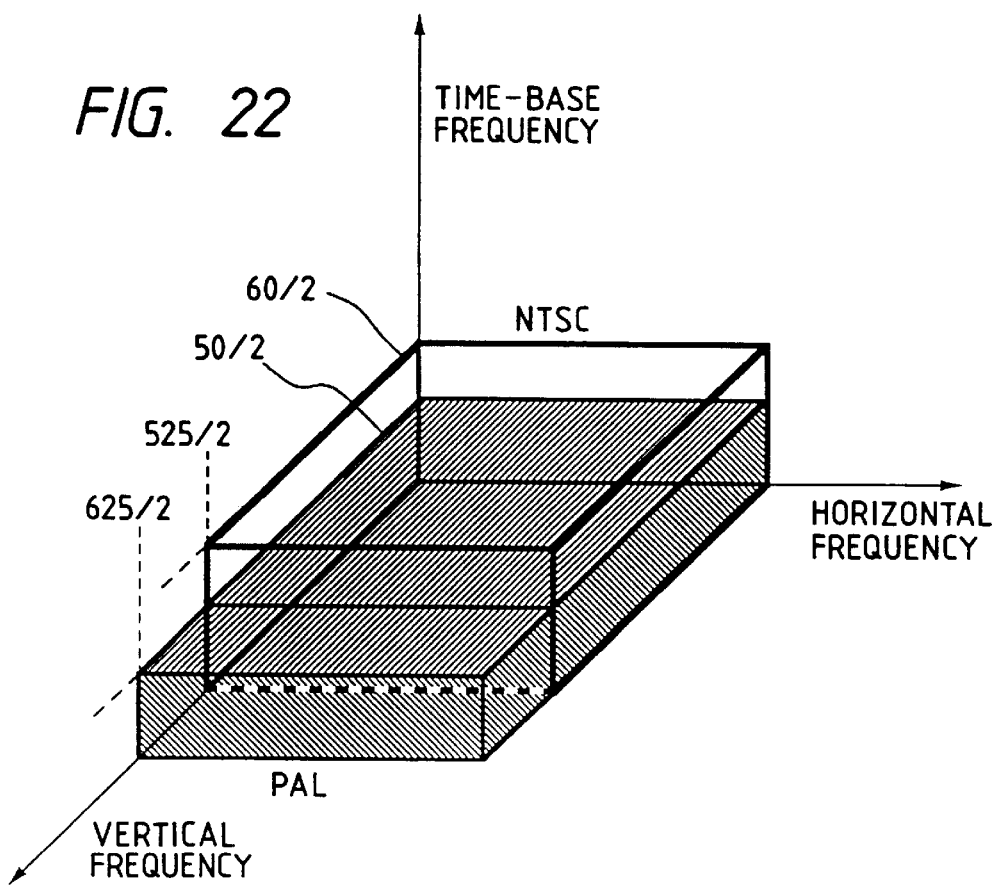
FIG. 22 is a diagram showing space frequency characteristics of video signals in accordance with NTSC system and PAL system.

Incidentally, between the current systems, the NTSC system and the PAL system, the signal frequency elements are also extremely different from each other as shown in FIG. 22, so that it is desired to improve the detection accuracy by selectively using the best frequency element based upon the object or picture taking conditions (surrounding luminous intensity etc.). That is, it is preferable to adaptively select the frequency element according to the picture taking conditions.

As shown in FIG. 22, when considering horizontal frequencies as the same thing, on the plane of coordinates formed of three kinds of frequency axes, the NTSC system shows 60 scenes/sec. on the time axis and scanning lines of 525 on the vertical axis, so that the video signal elements are present in the frequency region defined with 60/2 (scenes/sec.) and 525/2 (scanning lines), respectively. On the other hand, the PAL system shows 50 scenes/sec. on the time axis and scanning lines of 625 on the vertical axis, so that the video signal elements are present in the frequency region defined with 50/2 (scenes/sec.) and 625/2 (scanning lines), respectively.

Accordingly, it is possible to further improve the TV-AF performance by effectively utilizing the above-mentioned differences in characteristic. According to this, it can be attained to optimize AF characteristic to an object which is hard to be photographed.

Incidently, in system conversion processing, the field memory such as the field frequency conversion circuit 42 or the like occurs a delay of image information equal to or more than one scene, for example, as described above. When generating a TV-AF control signal based upon such an information delay, the response of focussing operation becomes unstable and slows down in the television AF system.

According to the present invention, however, the focussing signal is obtained from a step before the step of the signal processing, so that it can be prevented from the deterioration of the response that is caused by the delay in the memory.

3. Dynamic Image Compression Technique

A principle of compression is to reduce data amount by removing redundancy of which an image includes in advance. In a static image, the compression is performed in consideration of spatial redundancy. On the other hand, although, in a dynamic image, the compression is performed in consideration of time redundancy, the fundamental principle is based on the static image compression technique. The dynamic image compression technique consists of four elements as follows:

(1) DCT processing;
(2) Quantization processing;
(3) Coding processing; and
(4) Motion adaptive processing.

Here, an expansion process can be considered to be a reverse operation to the compression process mentioned above. Also, (1) to (3) are common items between the static picture and the motion picture. The details can be referred to "Assumption of Multimedia and Information Compression (2)", *Electronics*, May, 1992.

Hereinafter, summaries of the respective processings will be described in due order.

(1) DCT (Discrete Cosine Transform) Processing

Definition: A value in the space coordinates is converted into a frequency.

Firstly, an input frame is divided into blocks of the order of 8×8 pixels before performing the compression processing. Then, a multiplication processing of a DCT coefficient is performed so as to convert space data into frequency data. Although there is no reduction of data amount with the DCT processing, a coordinate transformation can be performed such that the data dispersed within the frame are concentratedly placed as far as seen from other coordinate system. That is, making the most of tendency that information energy concentrates more on the low side of the space frequency as a general characteristic of image, this processing step plays a role in performing the compression processing effectively after the DCT processing.

(2) Quantization Processing

Definition: Data amount is reduced by rounding a word length of coefficients converted into a frequency element.

A set of data coefficients every frequency element, being generated by the DCT processing, is divided by a proper numerical value so as to omit the figures below the decimal point, so that the number of bits necessary for expressing the respective coefficient data can be reduced, thus compressing the overall quantization data amount. Such a divisor is set every frequency element in detail so that the compressibility can be improved, while keeping a desired image quality.

(3) Coding Processing

Definition: Coding processing characterized in that a code having a length corresponding to data generating frequency is assigned. This consists of three processings as described below.

a. Zigzag Scanning

This is to perform rearrangement of the data, while shifting from DC element to horizontal and vertical high frequency elements in the zigzag direction in order to convert the frequency coefficient data arranged on two-dimensional plane into a one-dimensional data row.

b. Run Length Coding

A sequence of generation of the same numerical value (mainly, zero) is replaced by a code to express it in the lump. For example, it can be referred that "zero appears continuously eight times". Thus, a code is assigned to a plurality of data so as to reduce the number of coded bits. If the data behind a certain position are all zero, an end code is assigned. The end code is defined such that "data transmission in the block is finished with this data", thereby including the effect of a large data reduction.

c. VLC (Variable Length Coding)

A code having a small bit number is assigned to a numerical value which appears frequently, thus substantially performing the reduction of the number of coded bits.

(4) Motion Adaptive Processing

Definition: The fundamental principle is to add such a technique as "the motion is detected to be predict" to the static image compression. The three points of compression technique of the dynamic image in the television standard will be described below.

a. Motion Detection

Image data corresponding to the time multiplying integrally as against fields or frames are stored in a buffer of image data, such as a frame memory or the like, so as to occur a time lag. In the time difference between input and output ends of the memory, the motion is determined as to how many pixels corresponding to the stored data are generated. In the simplest example, a difference of brightness data between fields is calculated so as to consider absolute amount of the differential value as motion amount. To give another example, there is established a method, such as a correlation matching method or the like, in which movement of the two-dimensional coordinates to the position of a high degree of correlation of pixel data is calculated so as to detect a vector of its movement.

b. Motion Compensative Prediction

A motion of an image is predicted from the vector of its movement, a new image is generated by calculation, and only a difference between the new scene generated from calculation and the actual scene is sent as a compensative data, so that the data amount can be reduced. That is, as a scene includes more static parts or the motion in the scene is slower, or a dynamic scene generates less prediction error linearly, compression effect becomes high.

c. Interlace Coding

A television signal, such as an NTSC signal or the like, forms a structure referred to interlace, in which scanning lines (hereinafter, called as lines) are skipped every another line for its arrangement. An odd field consisting of odd numbered 265.5 lines is coupled with an even field consisting of even numbered 265.5 lines so that a frame picture plane (525 lines) is formed.

However, when motion amount of an object to be projected on a picture plane is large, an easy composition of odd/even fields causes blurred image. The blurred portions lower a degree of spatial correlation on the picture plane in the vertical direction so that the above-mentioned spatial redundancy is reduced in the compression coding processing.

Thus, when the motion amount is small, compression processing pixel blocks are formed by use of a frame picture having a high vertical correlation. As a result of motion detection, if it is considered that a motion more than a predetermined amount is generated, frame pictures which extremely lower the vertical correlations are omitted and only each of odd/even field pictures having a proper correlation on the picture plane is used to form the compression processing pixel blocks.

Although, when the frame processing is performed as usual without, a changing processing of the above-mentioned field/frame, a proper compressed result can be obtained with respect to almost all images, a background view and a person or persons are combined like teeth of a comb in a large motion part so as to generate different data alternately every another line, resulting in generation of the vertical highest frequency element, that has been assumed to be generated with the least chance originally, in great quantities.

Thus, the step is provided to prevent the worst case, i.e., to prevent a breakdown of the compression system, which is caused by an object difficult to pick up its image exactly.

As described above, the coding processing is properly changed in response to the motion of images so that the compression processing can be realized such that the further efficiency is consistent with the image quality in the overall moving image.

Figure 5:
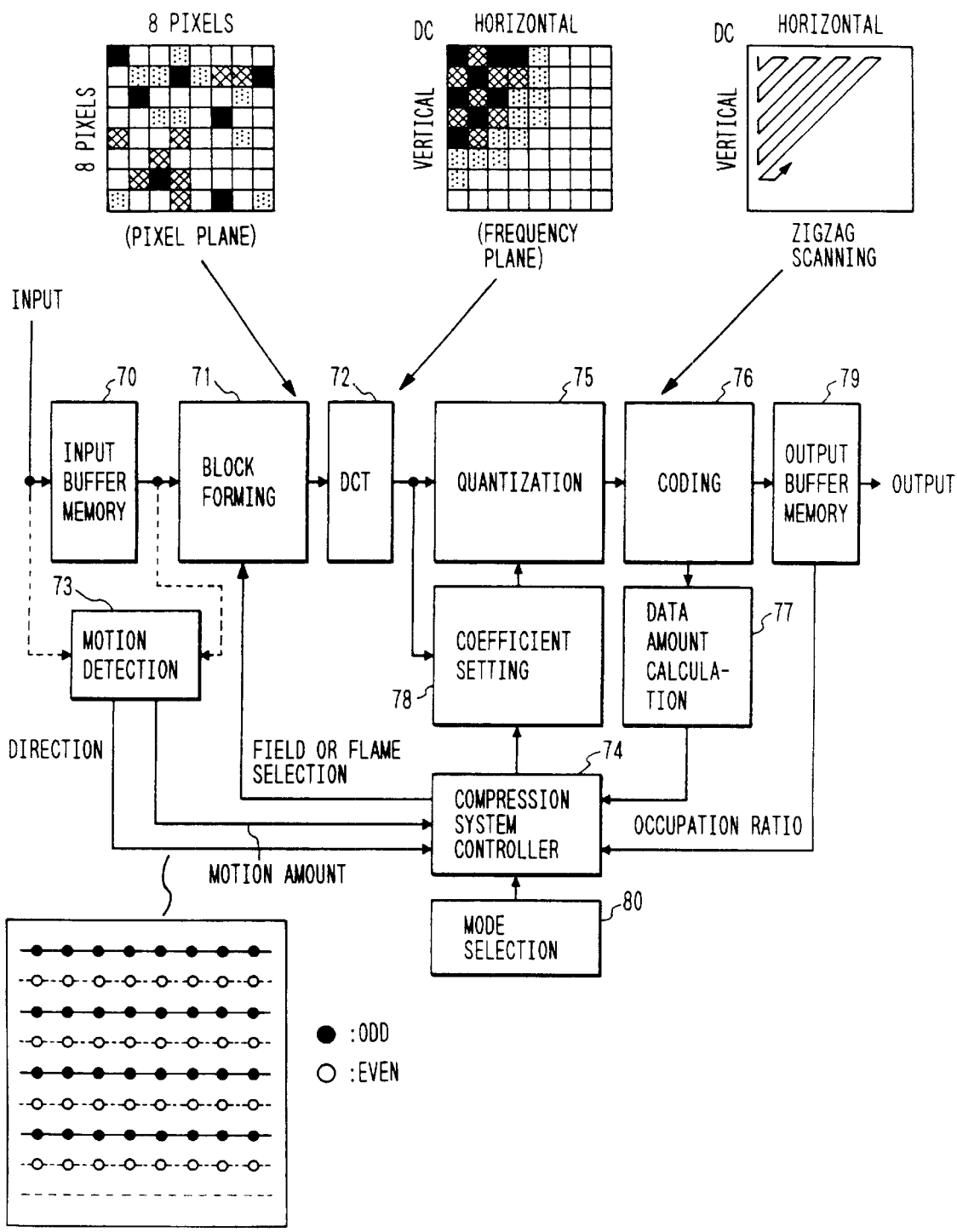
FIG. 5 is a block diagram showing an example of an image processing device using a dynamic image compression technique.

Next, another embodiment which partially utilizes the basic technique of the moving image compression mentioned above will be described with reference to FIG. 5.

After image pick-up mode selection, an SD or HD signal as a video signal is supplied to an input buffer memory 70. The video signal output from the input buffer memory 70 is divided into blocks, each consisting of 8×8 pixels, in a block forming processing circuit 71.

Then, an orthogonal transformation is performed in a DCT (discrete cosine transform) processing circuit 72 so as to be transformed on the surface of transfer coordinates of frequency elements. As a result, only a DC coefficient and an AC coefficient of reduced frequency elements have a large value and an AC coefficient of high frequency elements has a small value of the order of 0.

Meanwhile, with signals output from the input buffer memory 70, when a correlation between picture planes is high, an odd field and an even field are united with each other so as to perform the frame processing. On the contrary, if the correlation therebetween is low, the odd field and an even field are independently resulted in the field processing, respectively.

This is determined in a motion detection circuit 73 and then, the motion amount and discriminant data to the direction are input to a compression system controller 74 in accordance with how much difference between the corresponding pixel data is generated in the time difference between the input and output ends of the input buffer memory 70.

According to the result of the motion detection circuit 73, the frame or field processing is instructed from the compression system controller 74 to the block forming processing circuit 71 so that the block forming processing circuit 71 performs the block forming processing in response to such an instruction.

The coefficient data of frequency output from the DCT processing circuit 72 is input to a quantization processing circuit 75 in which a set of the coefficient data every frequency element is divided by a proper numerical value and omitted below the decimal point so that the bit number is reduced to compress the overall coded data amount.

In addition, a divisor is set optionally every frequency element so that the compressibility can be improved, while keeping a necessary image quality.

Then, the coded data compressed in a manner mentioned above are input to a coding circuit 76. In the coding circuit 76, the zigzag scanning is performed from the DC element to the horizontal and vertical high frequency elements in order to convert the data into the one-dimensional data row, the data are rearranged and replaced by a code expressing in the lump, for example, a sequence of appearance of zero, i.e., of the same numerical value, so as to perform the run length coding.

Further, when the data behind a certain position in the block are all zero, the above-mentioned end code is assigned, thereby performing a large data reduction. Then, a code having a small bit number is assigned to a numerical value which appears frequently, thus substantially performing the reduction of the number of coded bits.

Then, the variable length coded data is input to a data amount calculation circuit 77 so as to input the data amount in the compression system controller 74. The compression system controller 74 is connected with a coefficient setting circuit 78 so as to set a coefficient for each of horizontal and vertical frequency elements in response to the data amount.

The coefficient reaches a predetermined value by the coefficient setting circuit 78 and the output result is input to the quantization processing circuit 75, thus compressing the quantization data in due order mentioned above.

Then, after the reduction of the overall bit number and the predetermined compression by the coding circuit 76, the data is input to an output buffer memory 79. Although the coded data is output from the output buffer memory 79 in a constant data rate, the occupancy of the data is controlled by the compression system controller 74 such that the buffer memory 79 does not occur an underflow or overflow.

For example, when being nearly in the overflow state (when the occupancy is high), the coefficient is set large so that the data amount to be transmitted is adjusted to be small. On the other hand, when being nearly in the underflow state, the reverse operation is done.

Further, change in the compressibility, the compression system and the like of the dynamic image is performed by control of the compression system controller 74 in accordance with an operation of a mode selection portion 80.

As described above, the content of the DCT, the quantization and the coding processings are properly changed by the compression system controller 74 in accordance with the motion detection result of the image and every kind of mode setting input from the mode selection portion 80, so that it is possible to properly control the compressibility and compression system etc. in a motion image compressor, thus realizing an efficient compression processing of the motion image. It is needless to say that the compressibility can be changed optionally by changing the setting of the divisor in the coefficient setting circuit 78.

4. Description of Digital Recording Type VTR

[Recording Operation]

Figure 6A:
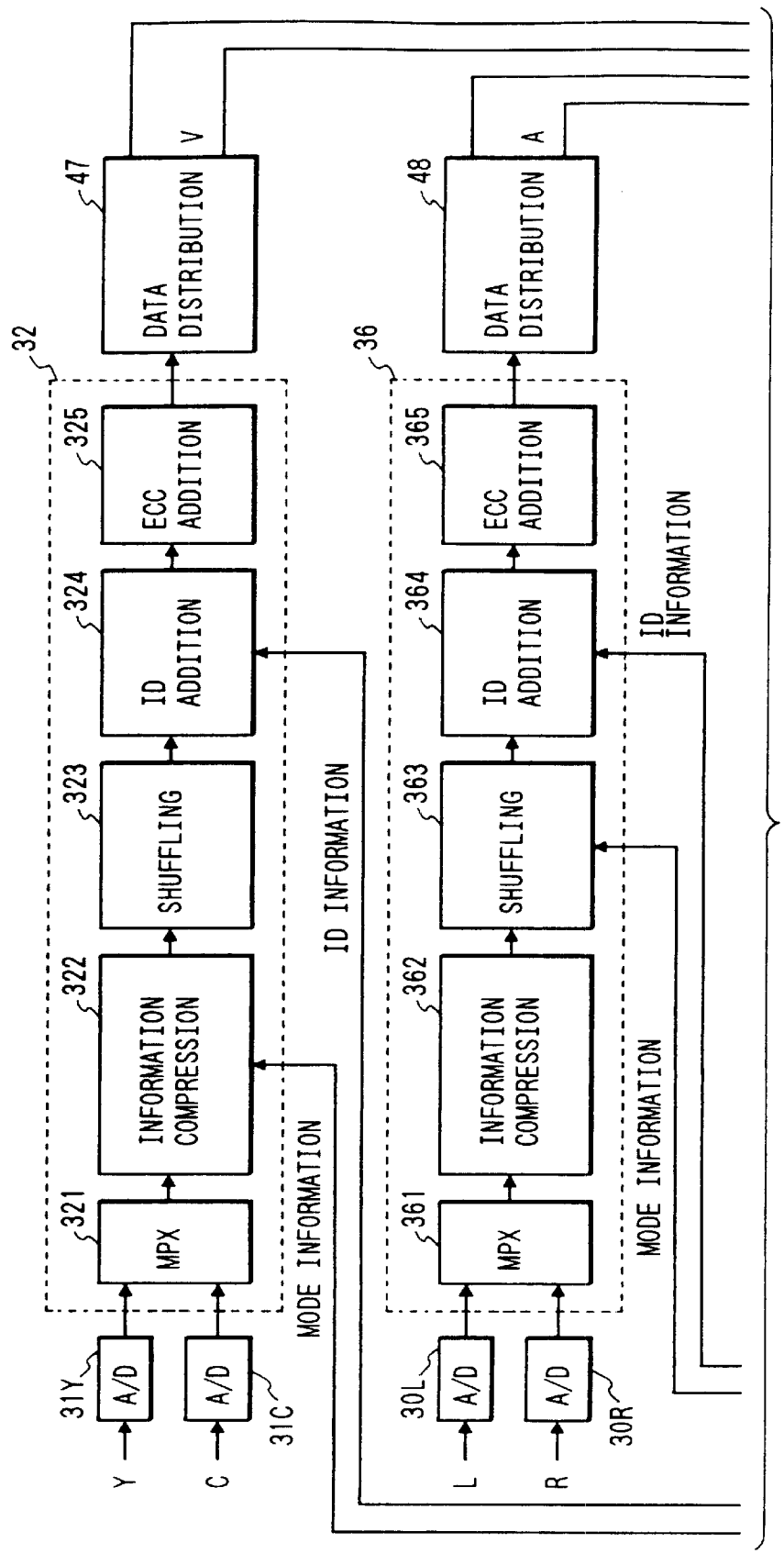

Next, referring now to FIGS. 6A and 6B showing structures of a recording system, the structure of a digital recording type VTR and the recording operation thereof will be described.

Video Input

A brightness signal (Y) and a color signal (C) of an image to be input are respectively converted into digital data Dy and Dc in AD convertors 31Y and 31C so as to be incorporated into the system.

Video Data Processing Circuit (32)

Such digital data Dy and Dc are multiplied by a data-multiplexer (MPX: 321) and the data amount of the image information is compressed by an information amount compression circuit 322 in accordance with mode information from a recording reproducing system controller 161. There may be provided compression processing circuits independently for Y and C, if necessary.

Next, a shuffling processing is done in a shuffling circuit 323 in order to strengthen the image data against a transmission line error. Here, when unifying the deviation of generation of information amount caused by: a density gap of images on the plane, it can be conveniently accomplished by arranging the shuffling process prior to the compression processing even if variable length codes such as a run length code are applied. Then, an ID addition circuit 324 adds data identification (ID) information for the restoration of data-shuffling. In the ID addition circuit 324, mode information of the system and the like are simultaneously recorded so as to be auxiliary information for the reverse compression processing (information amount expansion processing) in a reproducing process. Next, an error correcting code (ECC) for reproduction is added by an ECC addition circuit 325. Such an addition processing of redundancy data is performed respectively for each information of image and audio.

Audio Input

That is, stereo audio signals L and R are incorporated into AD convertors 30L and 30R so as to be processed in an audio data processing circuit 36 which has a circuit structure similar to the video data processing circuit 32 except for the compression procedure. If a recording rate of the video data is large, for example in case of the HD signal, the audio data may be proceeded to the recording process without the compression processing.

Data Distribution

The video data (V) and the audio data (A) generated in such a manner as mentioned above are sent to data distribution circuits 47 and 48 so as to perform the data distribution respectively such that the data rates correspond to capacities of the transmission lines (herein, respective magnetic head systems for recording reproduction).

Addition Information

With signals other than the A and V signals (data), a pilot signal output from a pilot signal generation circuit 33 for tracking servo and an auxiliary data (S) generated in a subcode generation circuit 43 based upon the information from the recording reproducing system controller 161 are multiplied every recording and transmission line by data-multiplexers (MPX: 38 and 37). For example, if it is a time axis multiplex processing, the pilot signal can be preferably taken a form of an area division ATF or the like as it is well known in a digital audio tape (hereinafter, called as a DAT).

Digital Modulation

A digital modulation processing for recording in response to a binary signal output from MPX is done in digital modulation circuits 34 and 35. To give an example, this is a conversion processing, a 8–10 conversion, NRZI: or the like.

Each of the transmission lines provides a magnetic head system having two channels so that a change processing is performed properly to change recording amplifiers 39 and 40, or 41 and 42, each that corresponds to each head, selectively in head change circuits 45 and 46 in accordance with the rotation state of the rotating drum 33 under directions of the servo control circuit 35.

As a result, a record current in response to an information signal at a predetermined timing can be supplied to a plurality of head Ha to Hd on the rotating drum 33.

Figure 7:
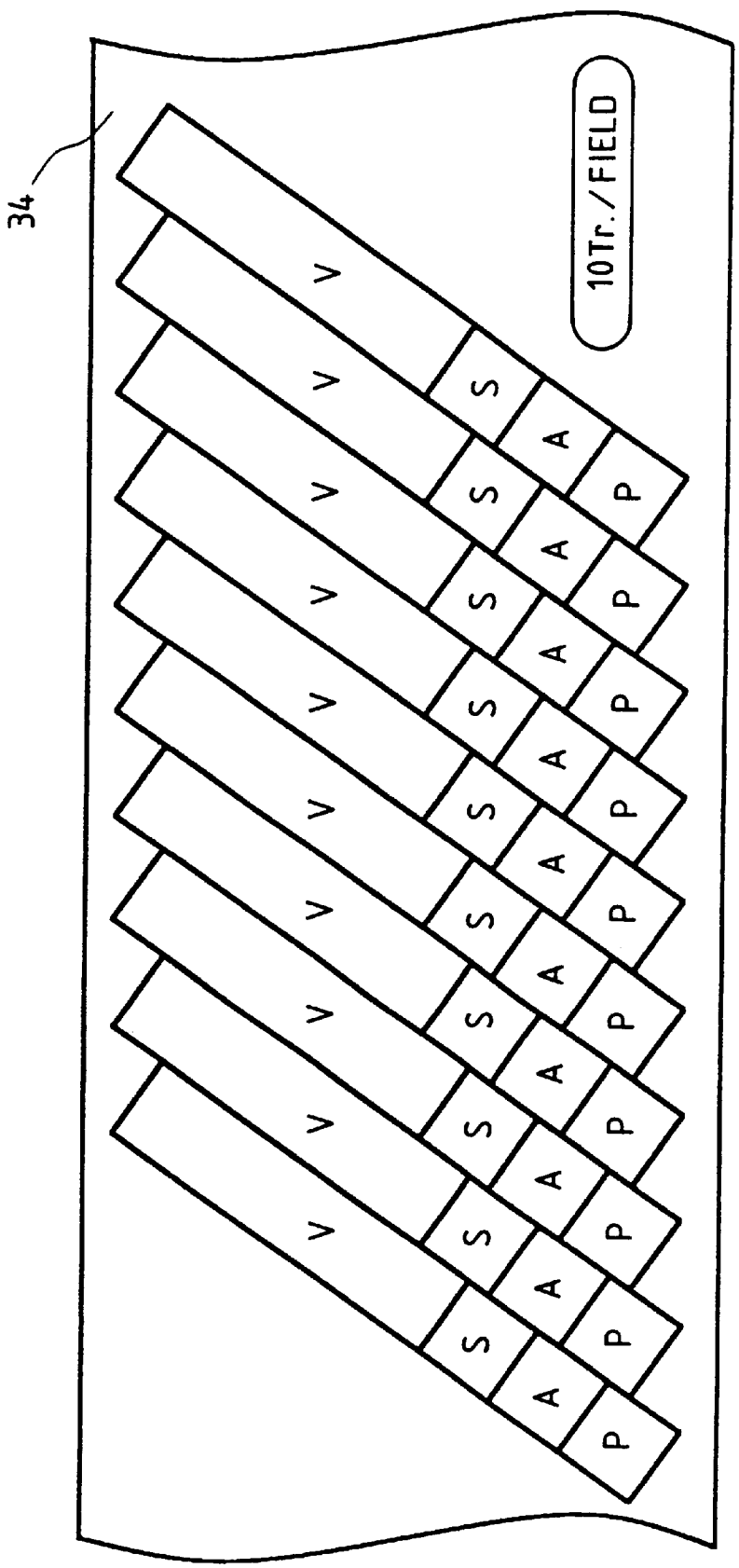
FIG. 7 is a diagram showing a track pattern on a magnetic tape.

With respect to this, FIG. 7 is a diagram of a track pattern showing a state in which signals A, P, S and V are changed for a predetermined time period and supplied to a magnetic recording system in due order so as to write the record on the tape 34.

Control System

A servo and a system controller for controlling such a tape run will be described.

The recording reproducing system controller 116 plays a role in replying to directive data input from the operation panel 24 shown in FIG. 1, monitoring every kind of state transition or the like in the recording system, while the servo control circuit 35 is mainly due to maintain a drive of the rotating drum 33 or capstan 37 steadily. Also, it can be considered the above-mentioned two circuits, the camera system controller 13 of FIG. 4 and the compression system controller 74 of FIG. 5 as one microcomputer block MB.

The servo control circuit 35 connects with a capstan motor 38 for speed control of tape feed and a capstan FG10 for grasping the rotating state thereof, and a drum motor 39 for driving the rotation of the rotating drum 33 and detectors FG7 and FG8 for confirming the rotation speed and the revolving phase, so as to control therebetween respectively.

Reproducing Operation

Figure 8B:
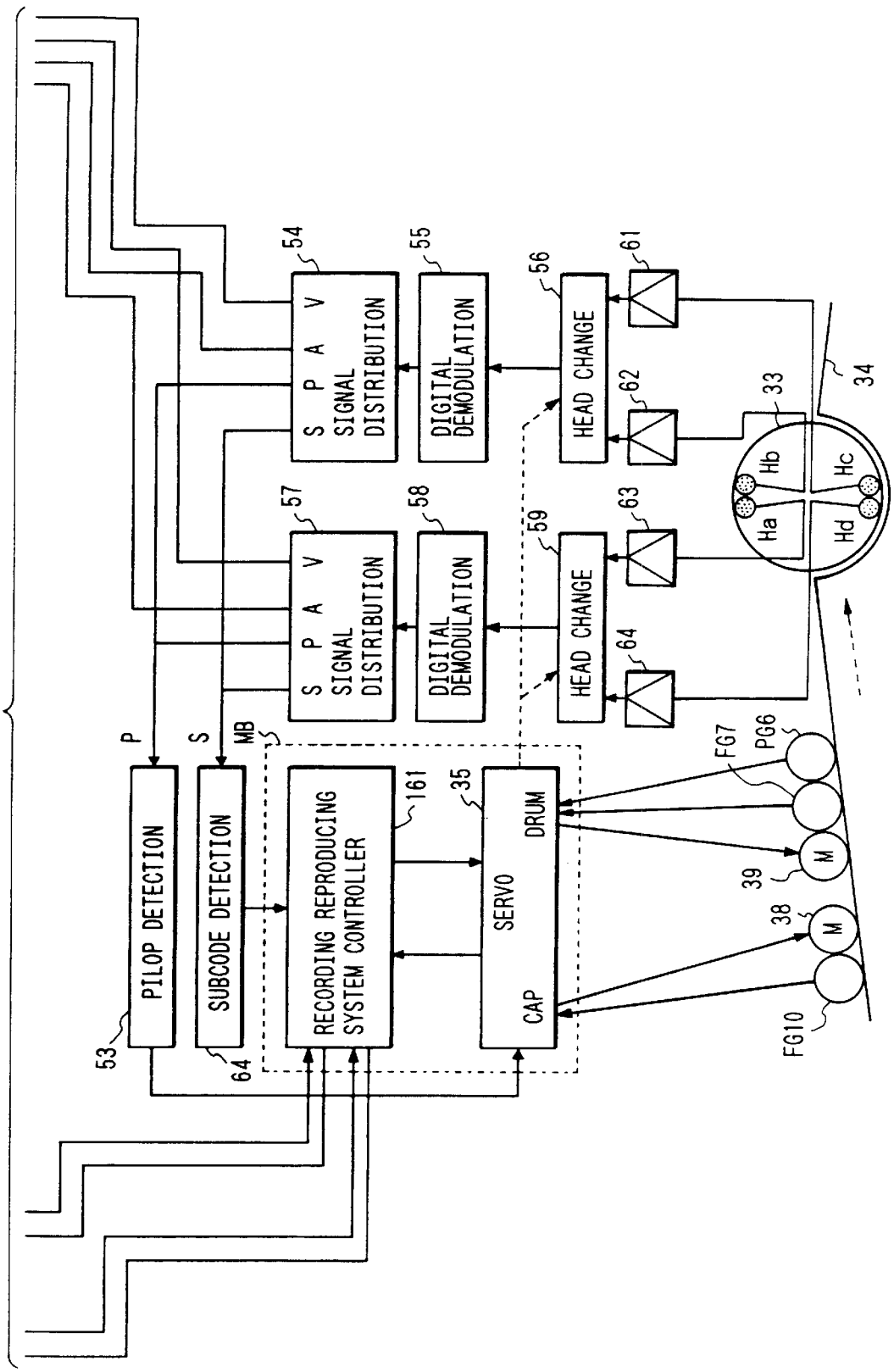

Next, referring to FIGS. 8A and 8B which show structures of a reproducing system, the structure of a digital recording type VTR and the operation thereof will be described.

Here, direction and speed controls with respect to the run of the magnetic tape 34, and a rotating control of the drum 33 are performed by the servo control circuit 35 and the recording reproducing system controller 161 in the same manner as that of the recording system in accordance with directions of the operation mode change input from the operation panel shown in FIG. 1.

The recording data (reproducing signals) read out by a plurality of the magnetic heads Ha to Hd on the rotating drum 33, being controlled with respect to the rotation thereof, are respectively amplified in reproducing head amplifiers 61, 62, 63 and 64 and supplied to two pairs of heads, different in azimuth angle, each pair being substantially opposite to each other at the angle of 180°, by head change circuits 56 and 59, so that the respective signal outputs are properly selected in accordance with the servo control circuit 35 so as to be supplied to digital demodulation circuits 55 and 58 in the next step.

The digital demodulation circuits 55 and 58 reconvert the reproducing signals into binary signals of "0, 1" by use: of techniques, such as differential detection, integral detection or redundancy detection by Viterbi decoding etc.

Figure 10:
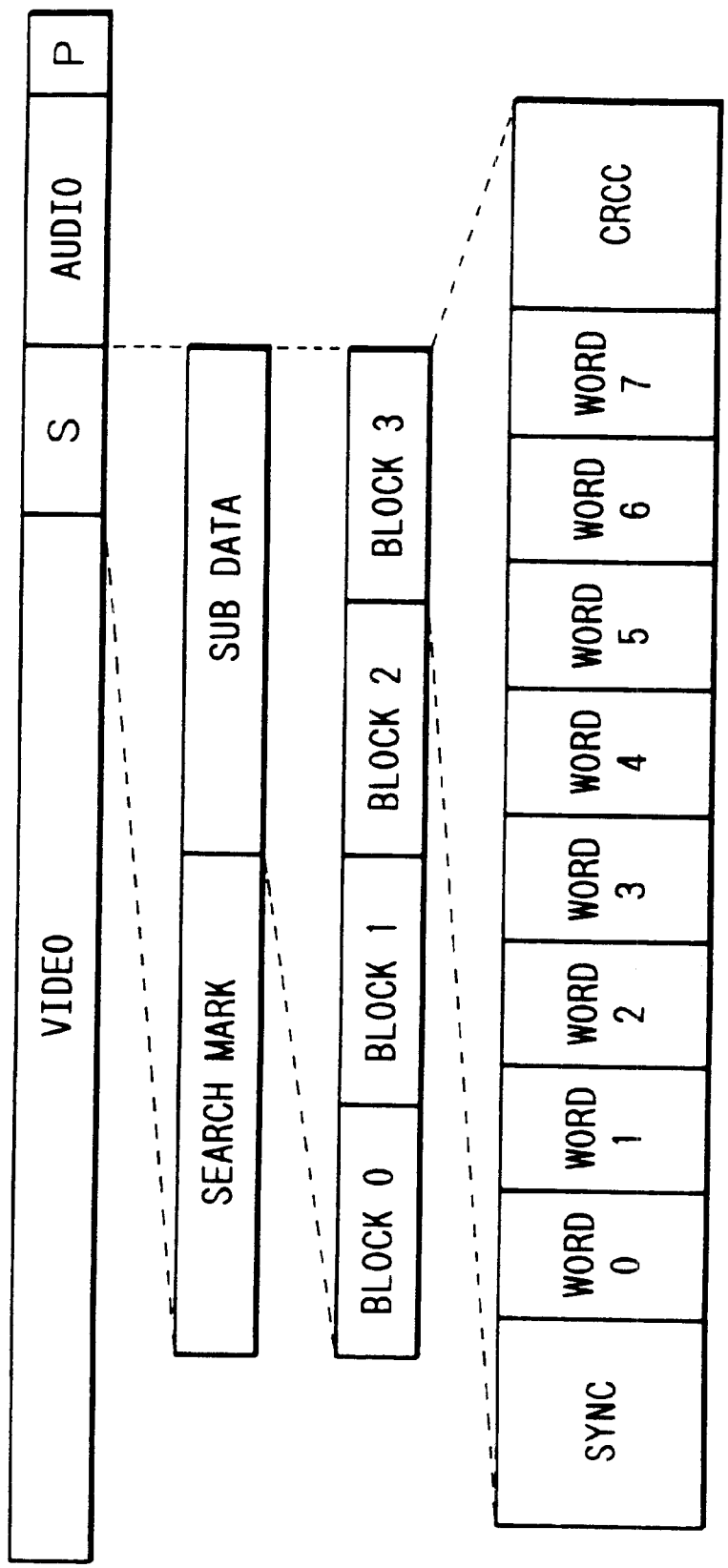
FIG. 10 is a diagram showing a track format of the magnetic tape.

The output signals of the digital demodulation circuits 55 and 58 are respectively supplied to signal distribution circuits 54 and 57 so as to be separated and distributed into the video signal V, the audio signal A, the pilot signal P for the tracking servo or subcode information S (See FIG. 10).

V: Video Signal

The video signals dispersed on the plurality of magnetic heads Ha to Hd are output from the signal distribution circuits 54 and 57, integrally processed in a data integration circuit 65 and restored to former video signals in a video data process circuit 52. Each component of the video data process circuit 52 performs the following processing.

An error correction circuit 525 detects an transmission line error of data generated in the recording reproducing system so as to correct the error in a correctable region, or perform an interpolation correction processing in the case of incorrectable error.

An ID detection circuit 524 draws every kind of ID signal inserted into the video data or subcode data depending on the video signals so as to supply the information to the recording reproducing system controller 161.

A deshuffling circuit 523 restores the data array of the shuffling processing performed in the recording process based upon the ID signals mentioned above in order to prevent deterioration of the image quality caused by incorrectable error by lacking data continuously.

An information amount expansion circuit 522 restores the information in a manner reverse to that of the information amount compression processing for reducing data amount in the recording process. Here, in case of performing the recording mode setting in the recording process, the circuit performs a restoration processing corresponding to the mode setting in the recording process through the recording reproducing system controller 161 based upon the reproducing ID signal mentioned above in consideration of possibility of such that the compression technique of data amount or the compressibility differs every recording mode.

A data separation circuit 521 outputs informations Y and C to a DA convertors 51Y and 51C respectively. Thus, an image equivalent to the signal input in the recording process is reconstructed.

A: Audio Signal

The audio signals dispersed on the plurality of magnetic heads Ha to Hd are output from the signal distribution circuits 54 and 57, integrally processed in a data integration circuit 66 and restored to former audio signals in a audio data process circuit 60. Each component of the audio data process circuit 60 performs the following processing.

An error correction circuit 605 detects an transmission line error of data generated in the recording reproducing system so as to correct the error in a correctable region, or perform an interpolation correction processing in the case of incorrectable error.

An ID detection circuit 604 draws every kind of ID signal inserted into the audio data or subcode data depending on the audio signals so as to supply the information to the recording reproducing system controller 161.

A deshuffling circuit 603 restores the data array of the shuffling processing performed in the recording process based upon the ID signals mentioned above in order to prevent deterioration of the sound quality caused by incorrectable error by lacking data continuously.

An information amount expansion circuit 602 restores the information in a manner reverse to that of the information amount compression processing for reducing data amount in the recording process. Here, in case of performing the recording mode setting in the recording process, the circuit performs a restoration processing corresponding to the mode setting in the recording process through the recording reproducing system controller 161 based upon the reproducing ID signal mentioned above in consideration of possibility of such that the compression technique of data amount or the compressibility differs every recording mode.

A data separation circuit 601 outputs informations L and R to a DA convertors 50L and 50R respectively. Thus, an audio equivalent to the signal input in the recording process is reconstructed.

P: Pilot Signal

Area division ATF type tracking pilot signals are output from the signal distribution circuit 54 and 57 so as to be input to a pilot signal detection circuit 53.

Here, when performing a processing similar to that of DAT, a time difference between the input pilot signal and a timing reference signal corresponding to off-track amount from both lateral tracks is detected as an error signal. The error signal is supplied to the servo control circuit 35 so as to control tape fed speed or the like, or also be used as auxiliary data for determination of the recording mode.

S: Subcode Information

Assuming that the video signal V and audio signal A are main informations, a data group having a small capacity, being in an auxiliary position, is referred to a subcode on the contrary to the main informations, enabling to perform a recording reproduction in a different area from the main informations. Particularly, the point different from the ID signal is to provide guard spaces before and behind the subcode area so as to perform the recording reproduction independent of the video signal and the audio signal. For this, an after record with respect to the subcode can be performed. With a difference in use, the ID signal is information necessary for a normal reproduction such as the recording mode unique to the main data, while the subcode suits to perform an index record of a program or an address code such as a tape position retrieval or the like. These informations mentioned above are sent to the recording reproducing system controller 161 for decision processings so as to control each portion if necessary.

Recording Mode Control

The VTR according to this embodiment includes three recording reproducing mode as described above. For this, since each of the recording track patterns differs in accordance with a recording mode setting selected optionally, the discriminant ID information is written in the subcode area in advance so as to enable the reproduction in response to the selected recording mode (see FIG. 10). Hereinafter, three recording track patterns and a mode discrimination procedure in the reproducing process will be described.

SD-low

Figure 11:
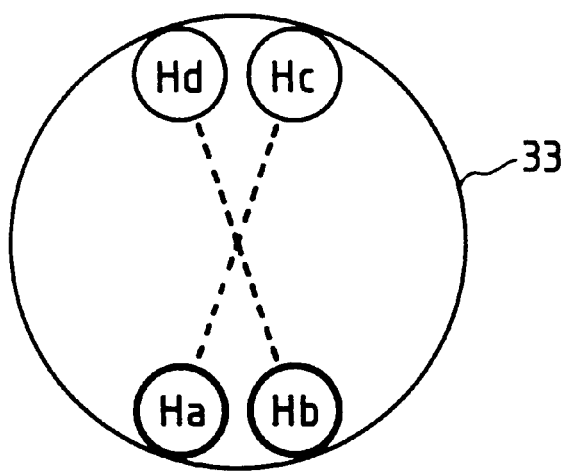
FIG. 11 is a diagram explaining magnetic heads used for a long time SD recording mode.
Figure 12:
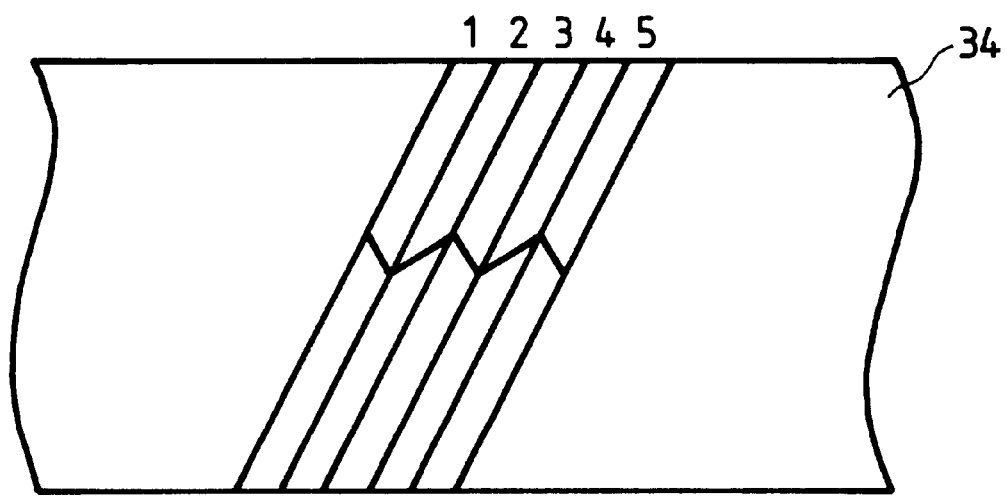
FIG. 12 is a diagram explaining a track formed in the long time SD recording mode.
Figure 13:
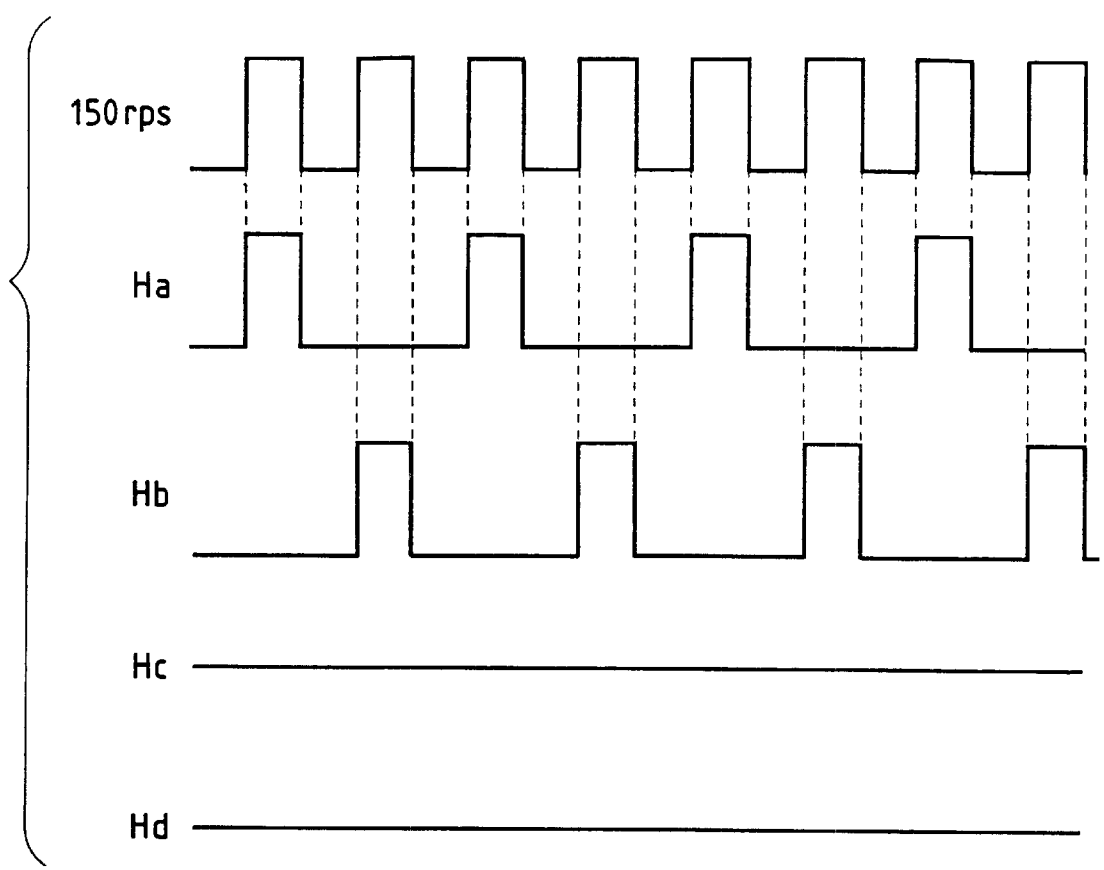
FIG. 13 is a timing chart showing recording currents supplied to the respective magnetic heads in the long time SD recording mode.

Referring to FIGS. 11 to 13, a long time recording mode in the SD will be described.

There are formed five tracks per picture plane (see FIG. 9), as shown in FIG. 12, using Ha and Hb out of four magnetic heads mounted on the rotating drum 33 of FIG. 11. In the case of 150 revolution per second, the drum PG expressing a revolving phase supplies a recording current to the magnetic heads Ha and Hb at high and low timing of a square wave shown in the line of 150 rps of FIG. 13.

SD-high

Figure 14:
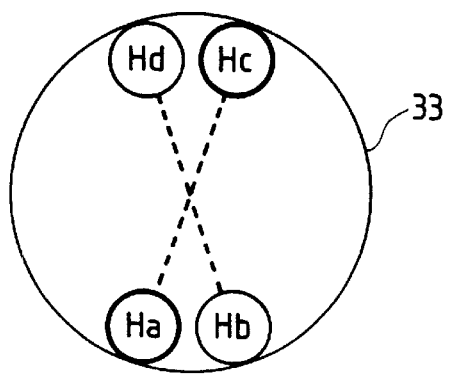
FIG. 14 is a diagram explaining magnetic heads used for a high quality SD recording mode.
Figure 15:
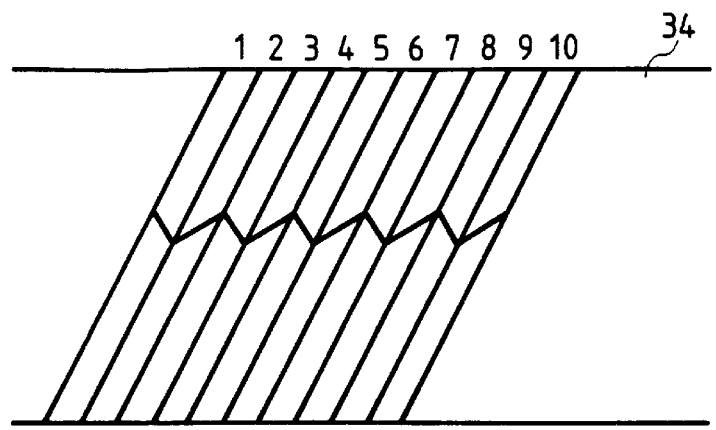
FIG. 15 is a diagram explaining a track formed in the high quality SD recording mode.
Figure 16:
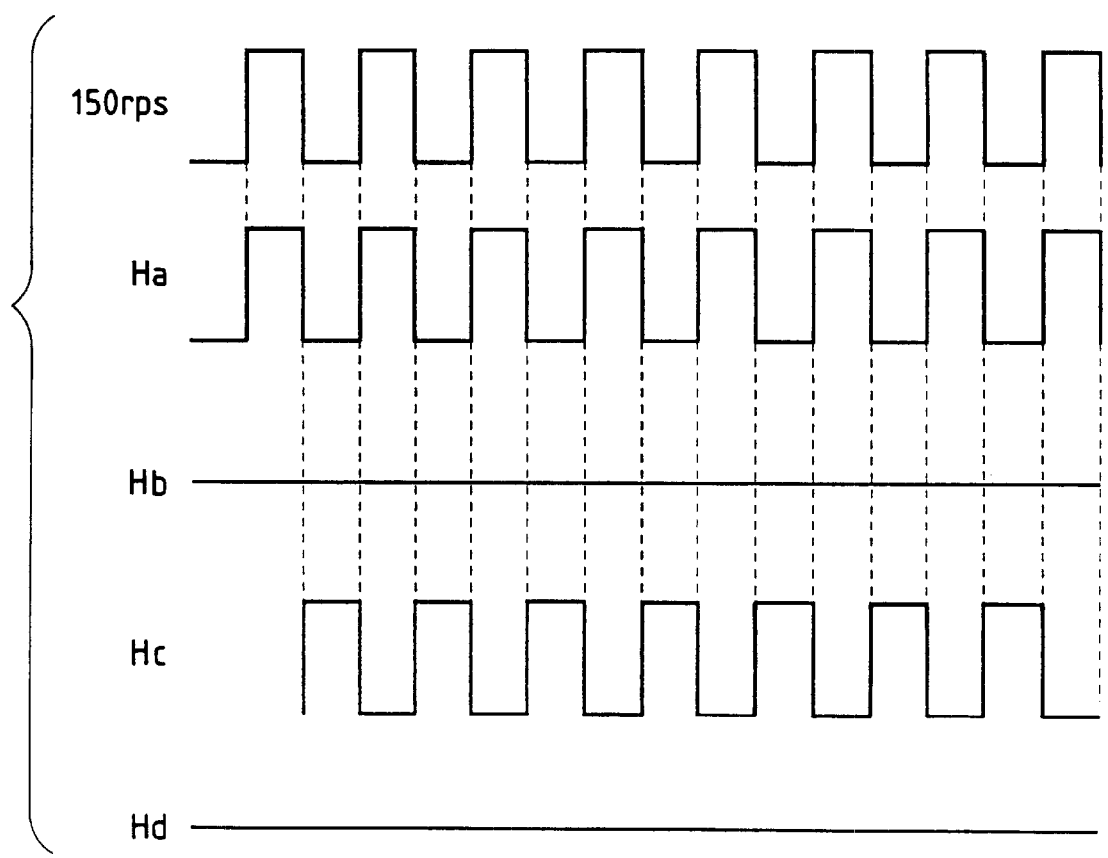
FIG. 16 is a timing chart showing recording currents supplied to the respective magnetic heads in the high quality SD recording mode.

Referring to FIGS. 14 to 16, a high quality recording mode in the SD will be described.

There are formed ten tracks per picture plane (see FIG. 9), as shown in FIG. 15, using Ha and Hc out of four magnetic heads mounted on the rotating drum 33 of FIG. 14. In the case of 150 revolution per second, the drum PG expressing a revolving phase supplies a recording current to the magnetic heads Ha and Hc at high and low timing of a square wave shown in the line of 150 rps of FIG. 16.

HD

Figure 17:
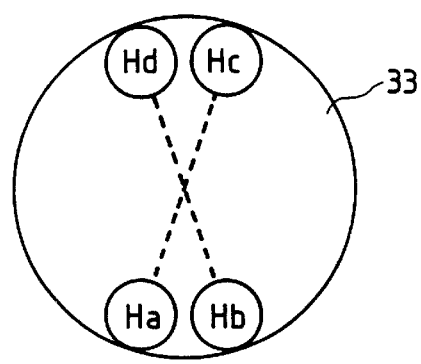
FIG. 17 is a diagram explaining magnetic heads used for a super high quality HD recording mode.
Figure 18:
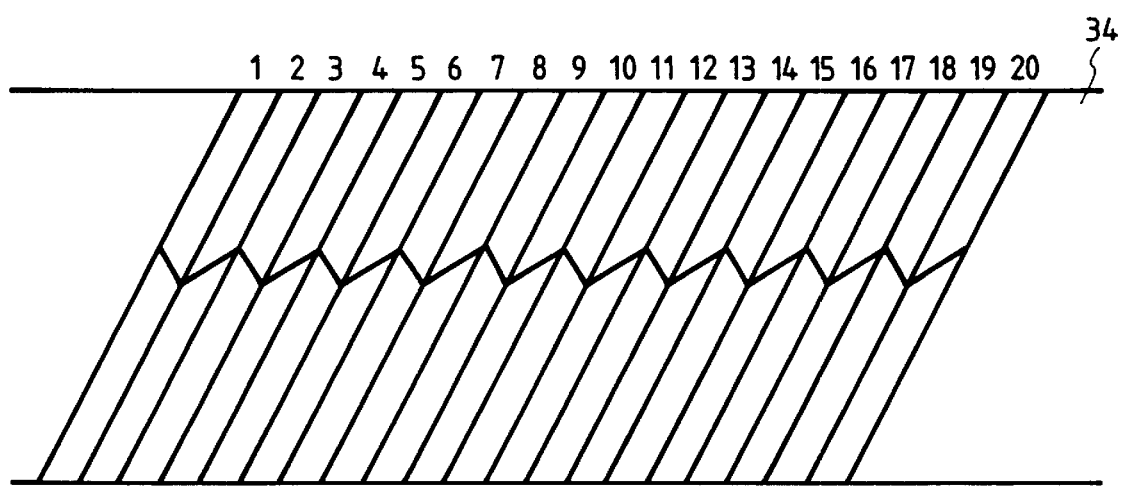
FIG. 18 is a diagram explaining a track formed in the super high quality HD recording mode.
Figure 19:
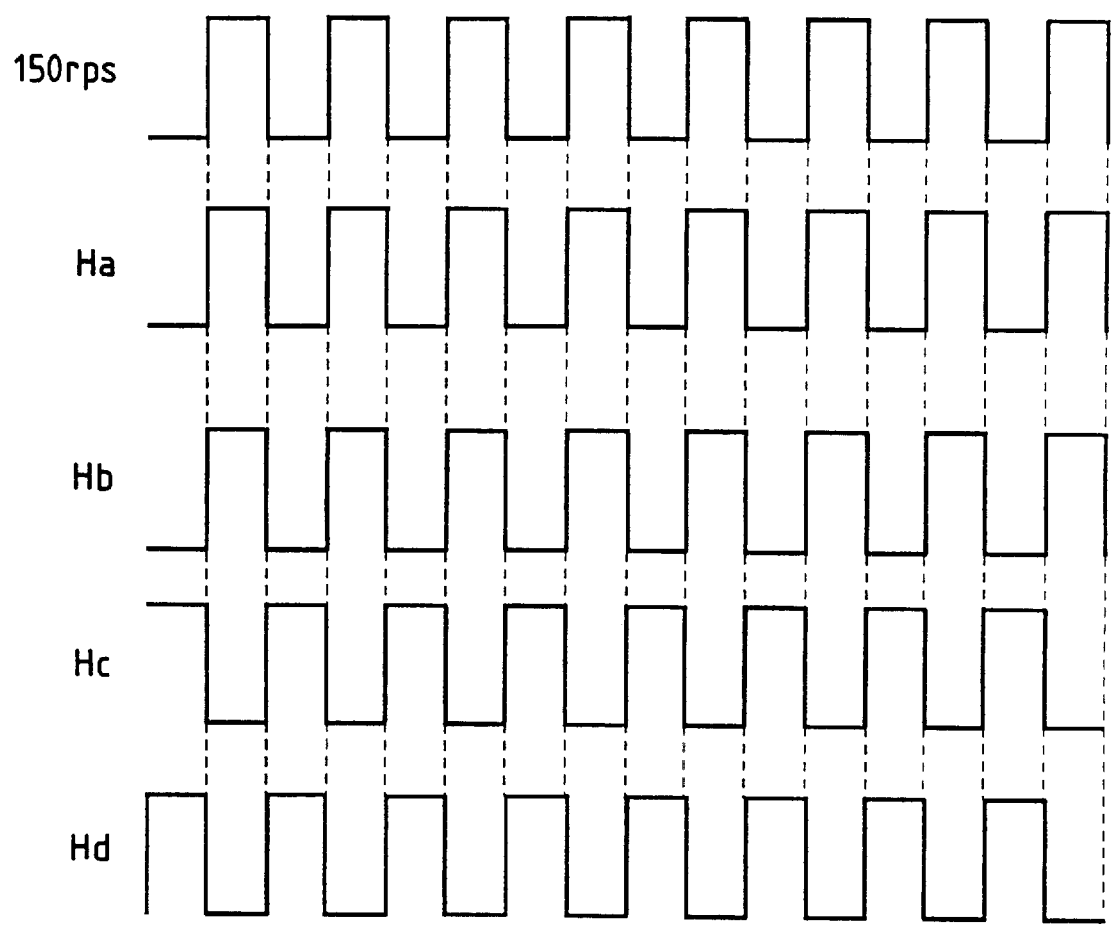
FIG. 19 is a timing chart showing recording currents supplied to the respective magnetic heads in the super high quality HD recording mode.

Referring to FIGS. 17 to 19, a super high quality recording mode in the HD will be described.

There are formed 20 tracks per picture plane (see FIG. 9), as shown in FIG. 18, using all of four magnetic heads Ha to Hd mounted on the rotating drum 33 of FIG. 17. In the case of 150 revolution per second, the drum PG expressing a revolving phase supplies a recording current respectively to the magnetic heads Ha to Hd at high and low timing of a square wave shown in the line of 150 rps of FIG. 19.

Figure 20:
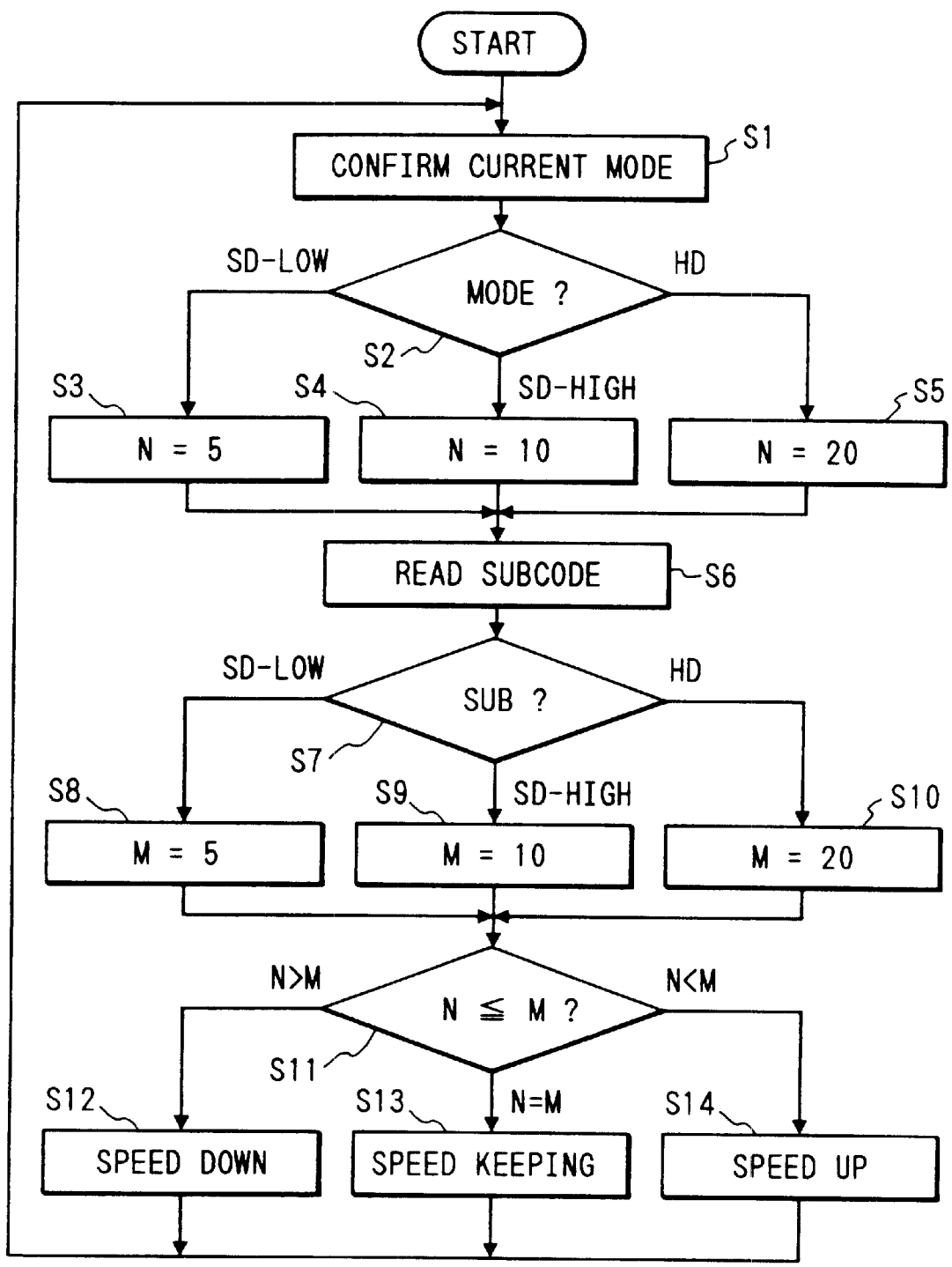
FIG. 20 is a flow chart showing a tape run speed control for each mode in the image reproduction.

Next, mode discrimination in the reproducing process and the control procedure thereof will be described with reference to a flow chart of FIG. 20.

Firstly, the current reproducing run mode is confirmed (step S1). Then, the reproducing run mode is determined as to which is an SD-low mode, an SD-high mode or an HD mode (step S2). According to the mode, the number of tracks is set respectively to 5 in the SD-low mode, 10 in the SD-high mode and 20 in the HD mode in a register N (steps S3, S4 and S5).

Next, a subcodes are detected from the reproducing digital signals so as to determine the mode in the recording process therefrom (step S7). As a result, the number of desired tracks per unit time is set respectively to 5 in the SD-low mode, 10 in the SD-high mode and 20 in the HD mode in a register M for desired track number (steps S8, S9 and S10).

Then, contents between the registers N and M are compared with each other (step S11). As a result, when the relationship between N and M shows N>M, it means that the current tape run speed is higher than that in the recording process, so that the target value of the capstan 37 for speed control is reset to the value of the register M so as to reduce the speed (step S12). If N=M, it means that the current tape run speed is equal to that in the recording process, so that the target value of the capstan 37 for speed control is kept as it is so as to keep the speed (step S13). If N<M, it means that the current tape run speed is lower than that in the recording process, so that the target value of the capstan 37 for speed control is reset to the value of the register N so as to increase the speed (step S14). Afterthat, the procedure returns to step S1 again to repeat the processings mentioned above.

As described above, according to the embodiments of the present invention, it is not required to adopt a complicated structure in which every kind of parameter is optimized for each image taking mode (television system: signal standard), so that the adjustment of the optical system, such as AF control or the like, can be preferably performed with such a simple structure as only video signals are used as they are, one including high frequency elements before conversion of the signal standard, another one before store in the storage means such as image memory or the like, or the other one being in a wide frequency band before change in space frequency characteristic.

What is claimed is:

1. An image pickup device usable with a recording means, comprising:
   an optical system that forms an optical image of an object to be projected;
   photoelectric conversion means for converting the optical image formed by said optical system into a video signal and outputting the video signal to the recording means, said photoelectric conversion means converting the optical image into a video image having a first signal format;
   conversion means for converting the video signal output from said photoelectric conversion means into a video signal having a second signal format different from the first signal format, the video signal of the second signal format converted by said conversion means being output to the recording means in parallel with the video signal of the first signal format output from said photoelectric conversion means; and
   adjustment means for adjusting said optical system based on the video signal of the first signal format output to the recording means in parallel with the video signal of the second signal format.

2. An image pick-up device comprising:
   an optical system that forms an optical image of an object to be projected;
   photoelectric conversion means for converting the optical image formed in said optical system into a video signal, said photoelectric conversion means converting the optical image into a video signal of a first format having a predetermined resolution;
   conversion means for converting the video signal output from said photoelectric conversion means into a video signal of a different format having a different resolution, the video signal of the different format converted by said conversion means being provided in parallel with the video signal of the first format converted by said photoelectric conversion means; and
   adjustment means for adjusting said optical system based on the predetermined resolution corresponding to the video signal of the first signal format provided in parallel with the video signal of the different format converted by said conversion means.

3. A device according to claim 1, wherein the first signal format comprises HDTV format, and wherein said second signal format comprises one of NTSC format, PAL format, and SECAM format.

4. A device according to claim 1, wherein said conversion means down-converts an aspect ratio of an image screen.

5. A device according to claim 1, wherein said conversion means converts a number of scanning lines in the first signal format to a number of scanning lines in the second signal format.

6. A device according to claim 1, wherein said conversion means converts a field frequency of the video signal.

7. A device according to claim 1, further comprising selecting means for switching between a first mode for processing the video signal with the first signal format, and a second mode for processing the video signal with the second signal format.

8. A device according to claim 7, further comprising switching means for switching between a first mode for processing the video signal in accordance with the first signal format and a second mode for processing the video signal according to the second signal format.

9. A device according to claim 8, wherein said switching means switches a recording signal format for recording the video signal on a recording medium between a first recording signal format corresponding to the first signal format and a second recording signal format corresponding to the second signal format.

10. A device according to claim 1, wherein said adjustment means comprises focus adjusting means.

11. An image processing device comprising:
    image signal output means for outputting a video signal in a predetermined signal format having a signal resolution;
    recording means for recording a video signal;
    processing means for processing the video signal output from said image signal output means, and for outputting the video signal to said recording means in one of a plurality of signal formats other than the predetermined signal format, the video signal of the one of the plurality of signal formats being output to said recording means in parallel with the video signal in the predetermined signal format output from said image signal output means; and
    adjustment means for adjusting said image processing device based on the signal resolution corresponding to predetermined signal format of the video signal output to said recording means in parallel with the video signal of the one of the plurality of signal formats.

12. A device according to claim 11, wherein the plurality of signal formats includes NTSC format, PAL format, and SECAM format, and the predetermined signal format is an HDTV format.

13. A device according to claim 11, wherein said processing means changes an aspect ratio of an image screen.

14. A device according to claim 11, wherein said processing means converts a number of scanning lines.

15. A device according to claim 11, wherein said processing means converts a field frequency of the video signal.

16. A device according to claim 11, further comprising switching means for switching between a first mode for processing the video signal in a first signal format and a second mode for processing the video signal in a second signal format.

17. A device according to claim 16, wherein said switching means switches the selected recording signal format for recording the video signal on a recording medium by said recording means between the first signal format corresponding to the first mode and the second signal format corresponding to the second mode.

18. A device according to claim 11, wherein said adjustment means comprises focus adjusting means.

19. A control method for an image processing device, comprising:
    a video signal output step for outputting a video signal in a predetermined signal format having a signal resolution;

a processing step of processing the video signal output in the video signal output step, and outputting the video signal in one of a plurality of recording formats other than the predetermined signal format, the video signal of the one of the plurality of recording formats being output in parallel with the video signal of the predetermined signal format output in said video signal output step;

a recording step of recording a video signal of a selected recording format; and an adjustment step of adjusting the image processing device on the basis of the video signal of the predetermined signal format output in parallel with the video signal of the one of the plurality of recording formats.

20. A method according to claim 19, wherein the plurality of signal formats includes HDTV format, NTSC format, PAL format, and SECAM format.

21. A method according to claim 19, wherein said processing step changes an aspect ratio of an image screen.

22. A method according to claim 19, wherein said processing step converts a number of scanning lines.

23. A method according to claim 19, wherein said processing step converts a field frequency of the video signal.

24. A method according to claim 19, further comprising a switching step of switching between a first mode for processing the video signal in a first signal format and a second mode for processing the video signal in a second signal format.

25. A method according to claim 24, wherein said switching step comprises switching a recording signal format for recording the video signal on a recording medium in said recording step between the first signal format corresponding to the first mode and the second signal format corresponding to the second mode.

26. A method according to claim 19, wherein said adjustment step performs focus adjustment.

27. An image pickup device usable with recording means, comprising:

an optical system that forms an optical image of an object to be projected;

photoelectric conversion means for photoelectrically converting the optical image formed by said optical system into a video signal having a first signal format, and for outputting the video signal to the recording means;

conversion means for converting the video signal output from said photoelectric conversion means into a video signal having a second signal format having a signal resolution different from the first signal format, the video signal of the second signal format converted by said conversion means being output to the recording means in parallel with the video signal of the first signal format output from said photoelectric conversion means; and adjustment means for adjusting said optical system based on the signal resolution corresponding to the first signal format output to the recording means in parallel with the video signal of the second signal format, even in the state where the second signal format is recorded, where the first signal format includes more information associated with adjustment of said optical system than the second signal format.

* * * * *

UNITED STATES PATENT AND TRADEMARK OFFICE
CERTIFICATE OF CORRECTION

PATENT NO.      : 6,636,266 B2
DATED           : October 21, 2003
INVENTOR(S)     : Koji Takahashi It is certified that error appears in the above-identified patent and that said Letters Patent is hereby corrected as shown below:

Title page,
Item [*] Notice, insert -- This patent issued on a continued prosecution application filed under 37 CFR 1.53(d), and is subject to the twenty year patent term provisions of 35 U.S.C 154(a)(2). --.

Drawings,
Sheet 4, Figure 4, "COMPOSIT" should read -- COMPOSITE --.
Sheet 7, Figure 6B, "PILOP" should read -- PILOT --.
Sheet 10, Figure 8B, "PILOP" should read -- PILOT --.

Column 1,
Line 39, "parameters" should read -- parameters for --.

Column 2,
Line 43, "store" should read -- storing --.

Column 5,
Line 4, "is occurred" should read -- occurs --.

Column 6,
Line 28, should read -- follows. ¶ Table for comparison of data amount by mode --.

Column 9,
Lines 65-66, "so as to occur a time lag." should read -- so that a time lag occurs. --.

Column 10,
Lines 21 and 48, "another" should read -- other --.

Column 11,
Line 9, "each:" should read -- each --.
Line 67, "occur" should read -- incur --.

Column 12,
Line 46, "by:a" should read -- by a --.

Column 13,
Line 26, "a" should read -- an --.
Line 37, "head" should read -- heads --.

Column 14,
Line 18, "use:" should read -- use --.
Line 34, "an" should read -- a --.

UNITED STATES PATENT AND TRADEMARK OFFICE
CERTIFICATE OF CORRECTION

PATENT NO. : 6,636,266 B2
DATED : October 21, 2003
INVENTOR(S) : Koji Takahashi

It is certified that error appears in the above-identified patent and that said Letters Patent is hereby corrected as shown below:

Column 15,
Line 4, "an" should read -- a --.
Lines 26-27, "of such" should be deleted.
Line 28, "differs" should read -- differs in --.
Line 47, "main informations," should read -- the main information, --.
Line 49, "informations," should read -- information, --.
Line 51, "informations." should read -- information. --.
Line 60, "suits" should read -- serves --.
Line 61, "These" should read -- This --.
Line 62, "informations" should read -- information --.
Line 62, "are" should read -- is --.
Line 67, "mode" should read -- modes --.

Column 16,
Line 50, "a" should be deleted.

Column 17,
Line 3, "Afterthat," should read -- After that, --.
Line 12, "store" should read -- storing --.

Signed and Sealed this

Twenty-second Day of June, 2004

JON W. DUDAS
*Acting Director of the United States Patent and Trademark Office*